United States Patent
Kotzur et al.

(10) Patent No.: US 11,093,329 B1
(45) Date of Patent: Aug. 17, 2021

(54) RAID PROXY STORAGE-DEVICE-ASSISTED DATA UPDATE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 16/832,752

(22) Filed: Mar. 27, 2020

(51) Int. Cl.
   G06F 11/10 (2006.01)
   G06F 3/06 (2006.01)

(52) U.S. Cl.
   CPC ........ G06F 11/1076 (2013.01); G06F 3/0619 (2013.01); G06F 3/0659 (2013.01); G06F 3/0689 (2013.01)

(58) Field of Classification Search
   CPC ................................................... G06F 11/076
   USPC .......................... 714/800, 797, 798, 801, 803
   See application file for complete search history.

(56) References Cited

U.S. PATENT DOCUMENTS

| | | | | |
|---|---|---|---|---|
| 6,112,255 A * | 8/2000 | Dunn | .................. | G06F 11/1076 710/52 |
| 7,080,198 B1 * | 7/2006 | Young | ................. | G06F 11/2087 711/114 |
| 8,065,481 B1 * | 11/2011 | Hiller | ..................... | G06F 3/0659 711/114 |
| 8,412,672 B1 * | 4/2013 | Radhakrishnan | ... | H04L 67/1097 707/609 |
| 9,384,093 B1 | 7/2016 | Aiello | | |
| 2005/0033933 A1 * | 2/2005 | Hetrick | ............... | G06F 11/2097 711/165 |
| 2005/0240740 A1 * | 10/2005 | Takeda | ................ | G06F 11/2082 711/162 |
| 2015/0319237 A1 | 11/2015 | Hussain et al. | | |

* cited by examiner

*Primary Examiner* — Fritz Alphonse
(74) *Attorney, Agent, or Firm* — Haynes and Boone, LLP

(57) ABSTRACT

A RAID proxy storage-device-assisted data update system includes a RAID parity data storage device and a first RAID primary data storage device without storage-device-assisted data update functionality, and a second RAID primary data storage device with storage-device-assisted data update functionality. The second RAID primary data storage device receives a command that identifies updated primary data for the first RAID primary data storage device and, in response, retrieves the updated primary data, current primary data from the first RAID primary data storage device, and current parity data from the RAID primary parity data storage device. The second RAID primary data storage device performs an XOR operation using the updated primary data, the current primary data, and the current parity data to generate updated parity data, transmits the updated primary data to the first RAID primary data storage device, and transmits the updated parity data to the RAID parity data storage device.

20 Claims, 21 Drawing Sheets

RAID PROXY STORAGE-DEVICE-ASSISTED DATA UPDATE SYSTEM

BACKGROUND

The present disclosure relates generally to information handling systems, and more particularly to performing storage-device-assisted data updates by a proxy storage device in a Redundant Array of Independent Disk (RAID) information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

The introduction of new storage technologies for use in RAID storage systems has provided for performance and efficiency improvements in RAID storage systems. For example, Non-Volatile Memory Express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect Express (PCIe) bus to provide low latency, internal parallelism, and/or other benefits known in the art, and have begun to be implemented as the RAID storage devices discussed above in order to assist in data update operations for the RAID storage system. The inventors of the present disclosure describe some techniques for performing RAID storage-device-assisted data updates in U.S. patent application Ser. No. 16/586,446, filed on Sep. 27, 2019, and those systems may utilize NVMe storage devices to perform some or all of the data update operations that are traditionally performed by a RAID storage controller device in the RAID storage system. Such RAID storage-device-assisted data update techniques allow the RAID storage controller device to be provided by generic processing systems (e.g., a generic System on a Chip (SoC)) as long as each of the RAID storage devices in the RAID storage system is enabled with the RAID storage-device-assisted data update functionality.

However, some RAID storage systems may be provided with subsets of RAID storage devices that are enabled with the RAID storage-device-assisted data update functionality discussed above, and subsets of RAID storage devices that are not enabled with the RAID storage-device-assisted data update functionality discussed above. For example, as datacenters switch from conventional RAID storage systems to storage-device-assisted data update RAID storage systems, a transition period may exist during which a mix of RAID storage devices with and without RAID storage-device-assisted data update functionality are utilized in RAID storage systems. In another example, RAID storage device manufacturers may produce "datacenter class" storage devices that do not include RAID storage-device-assisted data update functionality, and "enterprise class" storage devices that include RAID storage-device-assisted data update functionality, and combinations of those storage devices may be utilized in a RAID storage system. In yet another example, Solid State Drives (SSDs) used for RAID storage devices may have different media types that may not include RAID storage-device-assisted data update functionality, and those SSD may be utilized in a RAID storage system. As such, the RAID storage-device-assisted data update systems discussed above will not realize all the benefits available from RAID storage-device-assisted data update functionality (e.g., reduced complexity RAID storage controller devices, RAID storage controller devices that can scale with high performance RAID storage device, etc.) unless its RAID storage system is updated to include all RAID storage-device-assisted data update capable storage devices.

Accordingly, it would be desirable to provide a RAID storage-device-assisted data update system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a proxy storage-device-assisted Redundant Array of Independent Disks (RAID) storage engine that is configured to: receive a primary data update command that identifies updated primary data on a host system for storage on a RAID primary data storage device that does not include storage-device-assisted data update functionality; retrieve the updated primary data from the host system; retrieve current primary data from the RAID primary data storage device; retrieve current parity data from a RAID parity data storage device that does not include storage-device-assisted data update functionality; perform an XOR operation using the updated primary data, the current primary data, and the current parity data to generate updated parity data; transmit the updated primary data to the first RAID primary data storage device; and transmit the updated parity data to the RAID parity data storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
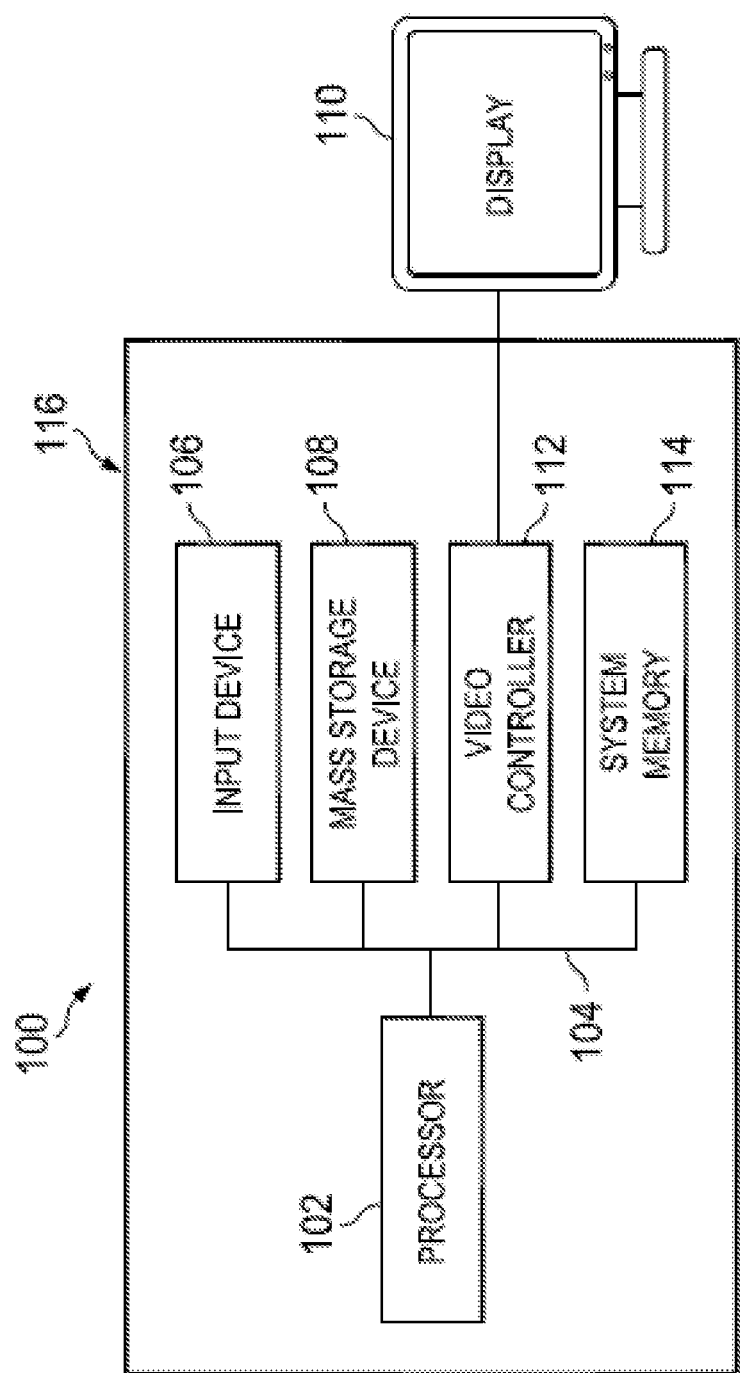
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
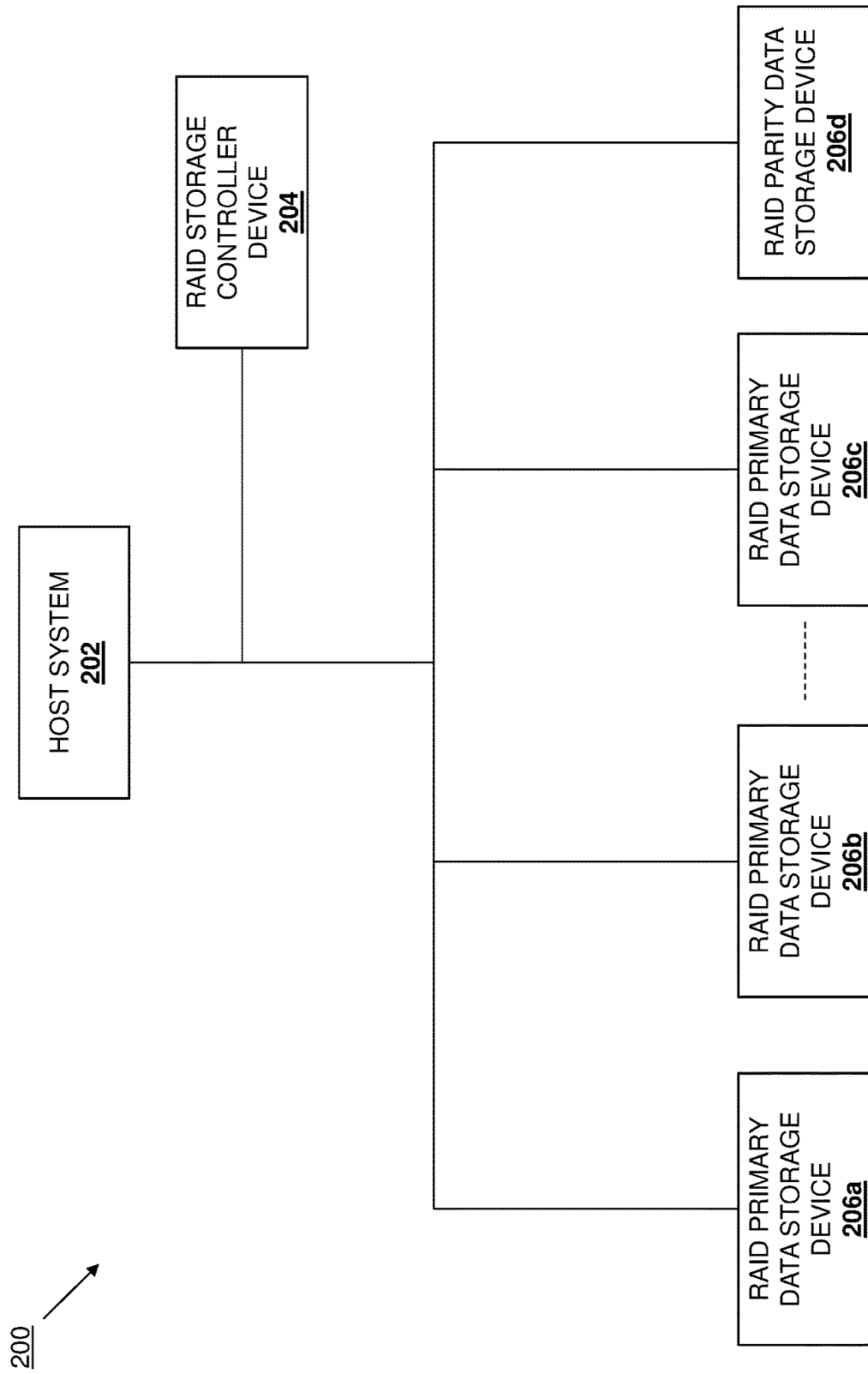
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID storage system 200 also includes a RAID storage controller device 204 that is coupled to the host system 202 in a "look-aside" RAID storage controller device configuration that couples the RAID storage controller device 204 to the host system 202 and each of the RAID data storage devices 206a-206d without positioning the RAID storage controller device 204 between the host system 202 and the RAID data storage devices 206a-206d. However, one of skill in the art in possession of the present disclosure will recognize that the RAID storage system 200 may include the RAID storage controller device 204 in an "in-line" RAID storage controller device configuration that couples the RAID storage controller device 204 between the host system 202 and each of the RAID data storage devices 206a-206d while remaining within the scope of the present disclosure as well. In an embodiment, the RAID storage controller device 204 may be provided by the IHS 100 discussed above with reference to FIG. 1, and/or may include some or all of the components of the IHS 100. For example, the RAID storage controller device 204 may include any storage device/disk array controller device that is configured to manage physical storage devices and present them to host systems as logical units.

Furthermore, the RAID storage system 200 also includes a plurality of RAID storage devices that are illustrated in FIG. 2 as a plurality of RAID primary data storage devices 206a, 206b, and up to 206c, along with a RAID parity data storage device 206d, each of which is coupled to the host system 202 and the RAID storage controller device 204. As discussed above, FIG. 2 illustrates how the RAID storage controller device 204 may be provided in a "look-aside" RAID storage controller device configuration that couples the RAID storage controller device 204 to the host system 202 and each of the RAID data storage devices 206a-206d, and without positioning the RAID storage controller device 204 between the host system 202 and the RAID data storage devices 206a-206d. As discussed in further detail below, the "look-aside" RAID storage controller device configuration provides the RAID data storage devices 206a-206d direct access to the host system 202 independent of the RAID storage controller device 204, which allows many conventional RAID storage controller operations to be offloaded from the RAID storage controller device 204 by the RAID data storage devices 206a-206c.

However, while illustrated and described as having specific RAID operational roles (e.g., "data storage operational roles" and "parity data storage operational roles"), as will be appreciated by one of skill in the art in possession of the present disclosure, any or all of the plurality of RAID storage devices in the RAID storage system 200 illustrated in FIG. 2 may perform dual roles for different data stripes, with any particular RAID storage device operating as a RAID primary data storage device for one data stripe and a RAID parity data storage device for another data stripe. As will be appreciated by one of skill in the art in possession of the present disclosure, the RAID storage devices 206a-206d in the RAID storage system 200 of FIG. 2 are described as operating in a RAID 5 configuration, with the RAID primary data storage devices configured to store primary data (e.g., provided by the host system 202), and the RAID parity data storage device configured to store parity data that may be utilized to recover primary data when that primary data becomes unavailable on one of the RAID primary data storage devices.

However, while a few RAID storage devices in a particular configuration are illustrated, one of skill in the art in possession of the present disclosure will recognize that many more storage devices may (and typically will) be coupled to the RAID storage controller device 204 (e.g., in a datacenter) and may be provided in other RAID configurations while remaining within the scope of the present disclosure. In a specific example, the RAID storage devices 206a-206d in the RAID storage system 200 may be provided in a RAID 6 (or "double-parity" RAID) configuration that utilizes two parity stripes on each RAID storage device, and allows for two RAID storage device failures within the RAID storage system 200 before any data is lost, and one of skill in the art in possession of the present disclosure will appreciate how the teachings below may be extended to RAID proxy storage-device-assisted data updates for Q data utilized in such RAID storage systems while remaining within the scope of the present disclosure as well. In the embodiments discussed below, at least some of the RAID storage devices 206a-206d are described as being provided by Non-Volatile Memory Express (NVMe) Solid State Drive (SSD) storage devices, but one of skill in the art in possession of the present disclosure will recognize that other types of storage devices with similar functionality as the NVMe SSD storage devices (e.g., NVMe PCIe add-in cards, NVMe M.2 cards, etc.) may be implemented for at least some of the RAID storage devices 206a-206d according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
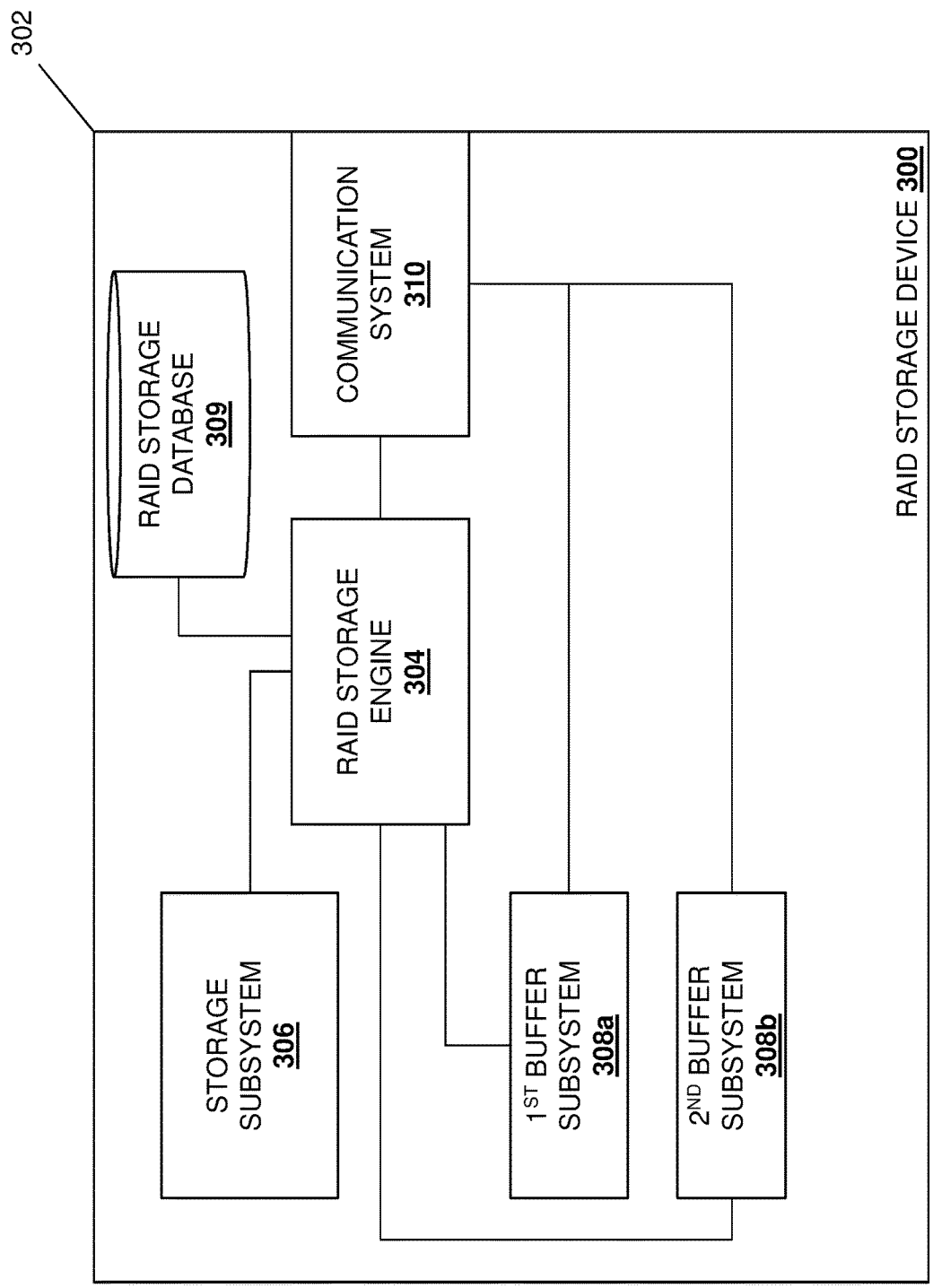
FIG. 3 is a schematic view illustrating an embodiment of a RAID storage device that may be provided in the RAID storage system of FIG. 2.

Referring now to FIG. 3, an embodiment of a RAID storage device 300 is illustrated that may provide any or all of the RAID primary data storage devices and the RAID parity data storage device discussed above with reference to FIG. 2. As such, the RAID storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. For example, the RAID storage engine 304 may include a RAID proxy storage-device-assisted data update engine that is configured to perform the RAID proxy storage-device-assisted data updates discussed below. While not illustrated, one of skill in the art in possession of the present disclosure will recognize that the RAID storage engine 304 may include, or be coupled to, other components such as a queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID storage engine 304 (e.g., via a coupling between the first buffer subsystem 308a and the processing system). Continuing with the example provided above in which the RAID storage device 300 is an NVMe SSD storage device, the first buffer subsystem 308a may be provided by device buffer that is internal to the NVMe SSD storage device, not accessible via a PCIe bus connected to the NVMe SSD storage device, and conventionally utilized to initially store data received via write commands before writing them to flash media (e.g., NAND flash memory devices) in the NVMe SSD storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID storage engine 304 (e.g., via a coupling between the second buffer subsystem 308b and the processing system). Continuing with the example provided above in which the RAID storage device 300 is an NVMe SSD storage device, the second buffer subsystem 308b may be provided by a Controller Memory Buffer (CMB) subsystem. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to store any of the information utilized by the RAID storage engine 304 as discussed below.

The chassis 302 may also house a communication system 310 that may be coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, the submission and completion queues discussed below, as well as any other components that provide NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

One of skill in the art in possession of the present disclosure will recognize that, in the examples below, one or more of the RAID storage devices 206a-206d may be provided by the RAID storage device 300, while others of the RAID storage devices 206a-206d may not include some or all of the components of the RAID storage device 300. For example, the embodiment discussed below with regard to FIGS. 6A-6H includes the RAID primary data storage device 206a provided by the RAID storage device 300 including RAID storage-device-assisted data update functionality, while including the RAID primary data storage device 206b and the RAID parity data storage device 206d that do not include RAID storage-device-assisted data update functionality. As such, while the RAID primary data storage device 206b and the RAID parity data storage device 206d may be provided by a RAID storage device that is similar to the RAID storage device 300 (e.g., including the storage subsystem 306 as described below), the RAID storage device providing the RAID primary data storage device 206b and the RAID parity data storage device 206d may not include some of the components or functionality of the RAID storage device 300 (e.g., the second buffer subsystem 308b, the RAID storage-device-assisted data update functionality provided by the RAID storage engine 304, etc.)

Similarly, the embodiment discussed below with regard to FIGS. 8A-8G includes the RAID parity data storage device 206d provided by the RAID storage device 300 including RAID storage-device-assisted data update functionality, while including the RAID primary data storage device 206b that does not include RAID storage-device-assisted data update functionality. As such, while the RAID primary data storage device 206b may be provided by a RAID storage device that is similar to the RAID storage device 300 (e.g., including the storage subsystem 306 as described below), the RAID storage device providing the RAID primary data storage device 206b may not include some of the components or functionality of the RAID storage device 300 (e.g., the second buffer subsystem 308b, the RAID storage-device-assisted data update functionality provided by the RAID storage engine 304, etc.)

Figure 4:
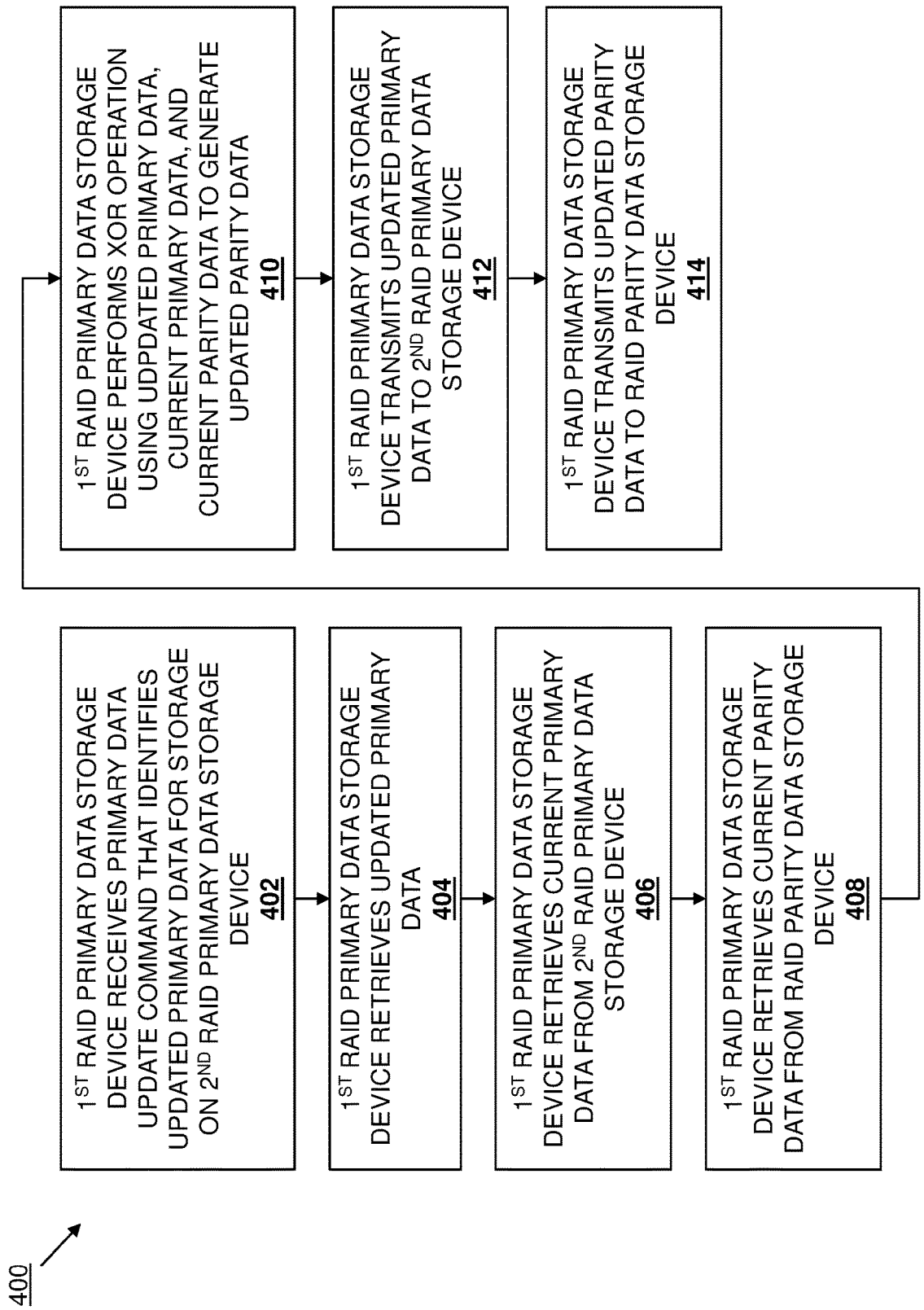
FIG. 4 is a flow chart illustrating an embodiment of a method for providing RAID proxy storage-device-assisted data updates.

Referring now to FIG. 4, an embodiment of a method 400 for RAID proxy storage-device-assisted data updates is illustrated. As discussed below, the systems and methods of the present disclosure provide a first "proxy" RAID storage device that performs RAID storage-device-assisted data update operations for at least one second RAID storage device that does not include RAID storage-device-assisted data update functionality. For example, a RAID storage system may include a RAID parity data storage device and a first RAID primary data storage device that do not include storage-device-assisted data update functionality, along with a second RAID primary data storage device that includes storage-device-assisted data update functionality. The second RAID primary data storage device may receive a primary data update command that identifies updated primary data on a host system for storage on the first RAID primary data storage device and, in response, retrieve the updated primary data from the host system, retrieve current primary data from the first RAID primary data storage device, and retrieve current parity data from the RAID primary parity data storage device. The second RAID primary data storage device may then perform an XOR operation using the updated primary data, the current primary data, and the current parity data to generate updated parity data, transmit the updated primary data to the first RAID primary data storage device, and transmit the updated parity data to the RAID parity data storage device. As such, RAID storage systems having some RAID storage devices that do not include storage-device-assisted data update functionality may realize the benefits available from RAID storage-device-assisted data update functionality (e.g., reduced complexity RAID storage controller devices, RAID storage controller devices that can scale with high performance RAID storage device, etc.) by having the RAID storage devices in that RAID storage system that do include storage-device-assisted data update functionality act as "proxies" to perform storage-device-assisted data updates for the RAID storage devices that do not include storage-device-assisted data update functionality.

Figure 5:
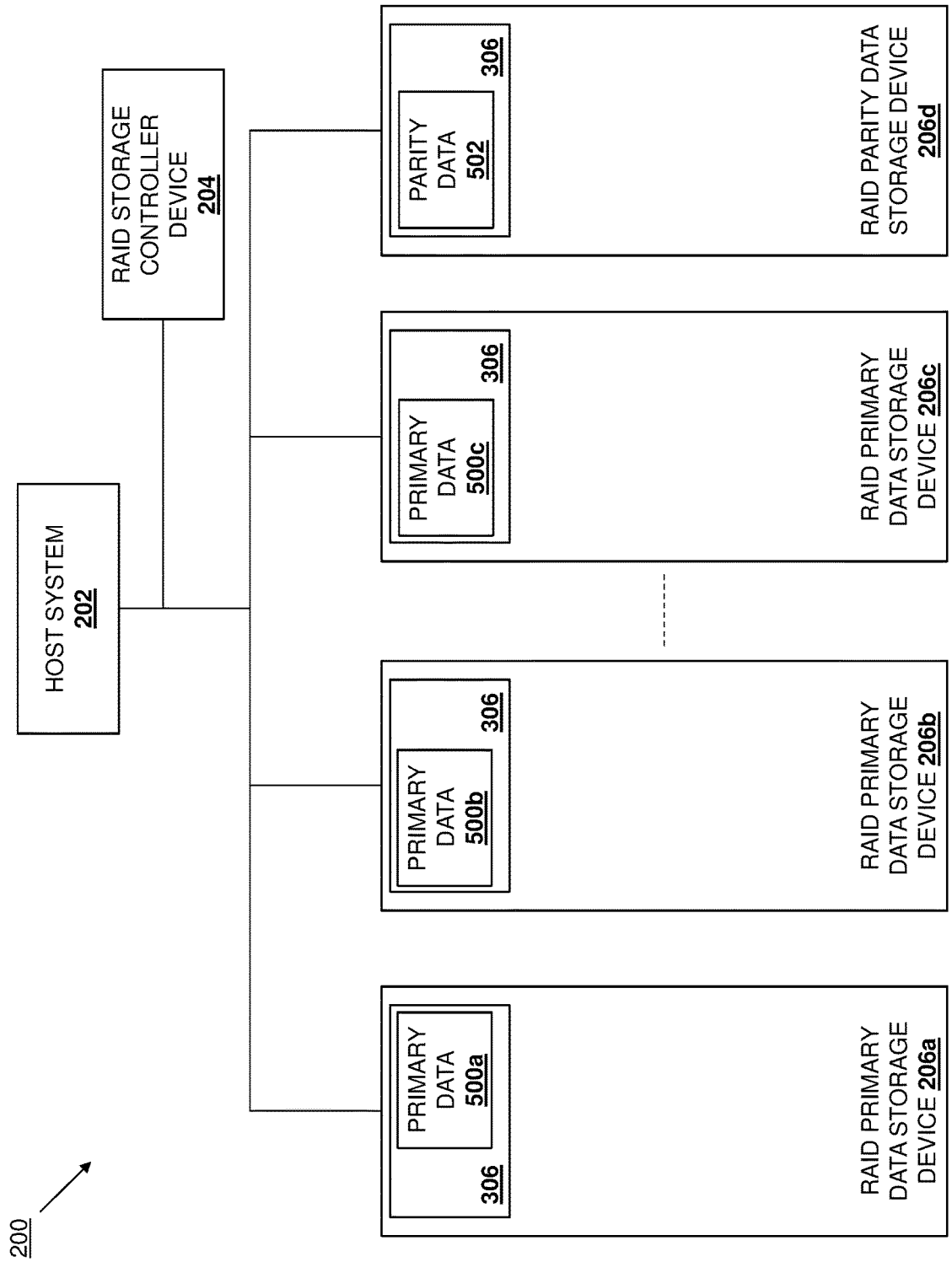
FIG. 5 is a schematic view illustrating an embodiment of the RAID storage system of FIG. 2 operating during the method of FIG. 4.

With reference to FIG. 5, the RAID storage system 200 is illustrated with the RAID primary data storage device 206a storing primary data 500a in its storage subsystem 306, the RAID primary data storage device 206b storing primary data 500b in its storage subsystem 306, and the RAID primary data storage device 206c storing primary data 500c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 502 in its storage subsystem 306, and one of skill in the art in possession of the present disclosure will recognize that the parity data 502 may have been generated via an XOR operation performed on the primary data 500a-500c in the RAID primary data storage devices 206a-206c, and allows for the rebuilding of any primary data stored on any one RAID primary data storage device in the event that primary data/RAID primary data storage device becomes unavailable.

As will also be appreciated by one of skill in the art in possession of the present disclosure, the primary/parity data storage configuration illustrated in FIG. 5 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

The RAID storage system 200 in the example provided for the method 400 discussed below with regard to FIGS. 6A-6H provides the RAID primary data storage device 206a having RAID storage-device-assisted data update functionality, and provides the RAID primary data storage device 206b and the RAID parity data storage device 206d without RAID storage-device-assisted data update functionality (as indicated by the element 600 in those figures). However, as also discussed below, one of skill in the art in possession of the present disclosure will appreciate that different combinations of RAID storage devices in the RAID storage system 200 may be provided with and without RAID storage-device-assisted data update functionality while remaining within the scope of the present disclosure as well. For example, the RAID storage system 200 in the example provided for the method 400 discussed below with regard to FIGS. 8A-8F provides the RAID parity data storage device having RAID storage-device-assisted data update functionality, and provides the RAID primary data storage device 206b without RAID storage-device-assisted data update functionality. As such, one of skill in the art in possession of the present disclosure will appreciate that any of the RAID storage devices in the RAID storage system 200 may act as a "proxy" to perform storage-device-assisted data update functionality for a RAID storage device that is not capable of such storage-device-assisted data update functionality while remaining within the scope of the present disclosure.

Figure 6A:
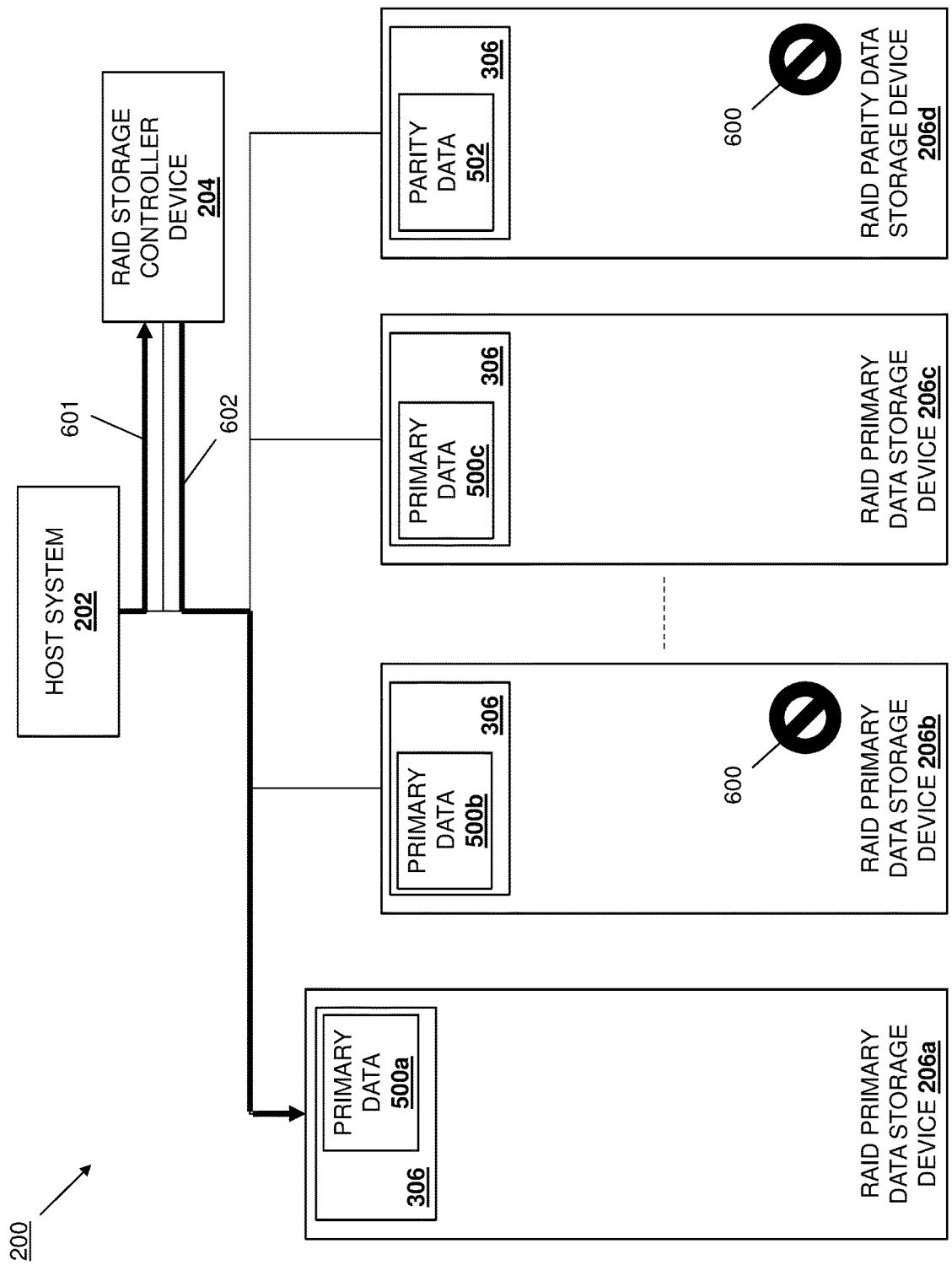
FIG. 6A is a schematic view illustrating an embodiment of the RAID storage system of FIG. 2 operating during the method of FIG. 4.

The method 400 begins at block 402 where a first RAID primary data storage device receives a primary data update command that identifies updated primary data for storage on a second RAID primary data storage device. With reference to FIG. 6A, the host system 202 may generate a write command 601 that instructs the writing of primary data that is located on the host system 200 to the RAID primary data storage devices 206a-206c, and may transmit that write command 601 to the RAID storage controller device 204. As will be appreciated by one of skill in the art in possession of the present disclosure, the generation and/or transmission of the write command 601 by the host system 202 to the RAID storage controller device 204 at block 402 may include a variety of control plane communications between the host system 202 and the RAID storage controller device 204 that have been omitted for clarity of discussion. As such, at block 402, the RAID storage controller device 204 may receive the write command 601 and, in response to that write command 601, may generate commands and transmit the commands to one or more of the RAID storage devices 206a-d. The discussion below describes a situation in which the RAID storage controller device 204 determines that the write command 601 requires that updated primary data be written to the RAID primary data storage device 206b, but one of skill in the art in possession of the present disclosure will appreciate that a write command may require updated primary data to be written to any RAID data storage device while remaining within the scope of the present disclosure as well.

As discussed above, in this example, the RAID primary data storage device 206b and the RAID parity data storage device 206d do not include RAID storage-device-assisted data update functionality, and in response to determining that the write command 601 requires that updated primary data be written to the RAID primary data storage device 206b (and corresponding updated parity data be written to the RAID parity data storage device 206d), the RAID storage controller device 204 may identify the RAID primary data storage device 206a as including the RAID storage-device-assisted data update functionality required to act as a "proxy" for the RAID primary data storage device 206b and the RAID parity data storage device 206d to perform the required primary and parity data update operations such that they may be offloaded from the RAID storage controller device 204. For example, the RAID storage controller device 204 may include (or have access to) a database (e.g., the RAID storage database 309) that identifies which RAID storage devices 206a-206d include RAID storage-device-assisted data update functionality, and in response to determining that data should be written to a RAID storage device, may use that database to determine if that RAID storage device includes RAID storage-device-assisted data update functionality and, if not, may use that database to identify a RAID storage device that does include RAID storage-device-assisted data update functionality to act as a "proxy". However, while a specific example has been provided, one of skill in the art in possession of the present disclosure will appreciate that a RAID storage-device-assisted data update capable RAID storage device may be selected to act as a "proxy" and perform RAID storage-device-assisted data updates for a RAID storage device that is not RAID storage-device-assisted data update capable in a variety of manners that will fall within the scope of the present disclosure as well.

As such, in an embodiment of block 402, the RAID storage controller device 204 may generate a command that instructs the writing of the updated primary data on the host system 202 to the RAID primary data storage device 206b, and transmit that command to the RAID primary data storage device 206a. For example, FIG. 6A illustrates the RAID storage controller device 204 transmitting a command 602 to the RAID primary data storage device 206a, and one of skill in the art in possession of the present disclosure will appreciate that the command 602 may identify the updated primary data on the host system 202, the primary data storage device 206b to which that primary updated data should be written, as well as any other information that would be apparent to one of skill in the art in possession of the present disclosure.

In some embodiments, the command 602 may be a multi-operation command like those described in U.S. patent application Ser. No. 16/585,296, filed on Sep. 27, 2019. For example, the command 602 may be a PROXY WRITE WITH XOR multi-operation command that is configured to cause the RAID primary data storage device 206a to perform the multiple operations described below. However, while described as providing a multi-operation command at block 402, one of skill in the art in possession of the present disclosure will recognize that the multiple operations performed by the RAID primary data storage device 206a discussed below may be performed in response to respective commands transmitted by the RAID storage controller device 204 while remaining within the scope of the present disclosure as well. In a specific example, the transmission of the command 602 may include the RAID storage controller device 204 providing the command 602 in a submission queue that is included in the communication system 310 in the RAID primary data storage device 206a/300, and then ringing a doorbell for the RAID primary data storage device 206a/300. However, one of skill in the art in possession of the present disclosure will recognize that the command 602 may be provided to the RAID primary data storage device 206a in a variety of manners that will fall within the scope of the present disclosure as well.

As such, in some examples the RAID storage engine 304 in the RAID primary data storage device 206a/300 may respond to the ringing of its doorbell by accessing the command 602 in the submission queue in its communication system 310. In embodiments in which the command 602 is a multi-operation command, the RAID storage engine 304 in the RAID primary data storage device 206a/300 may identify the multiple operations instructed by that command 602 (as described in U.S. patent application Ser. No. 16/585,296, filed on Sep. 27, 2019.)

Figure 6B:
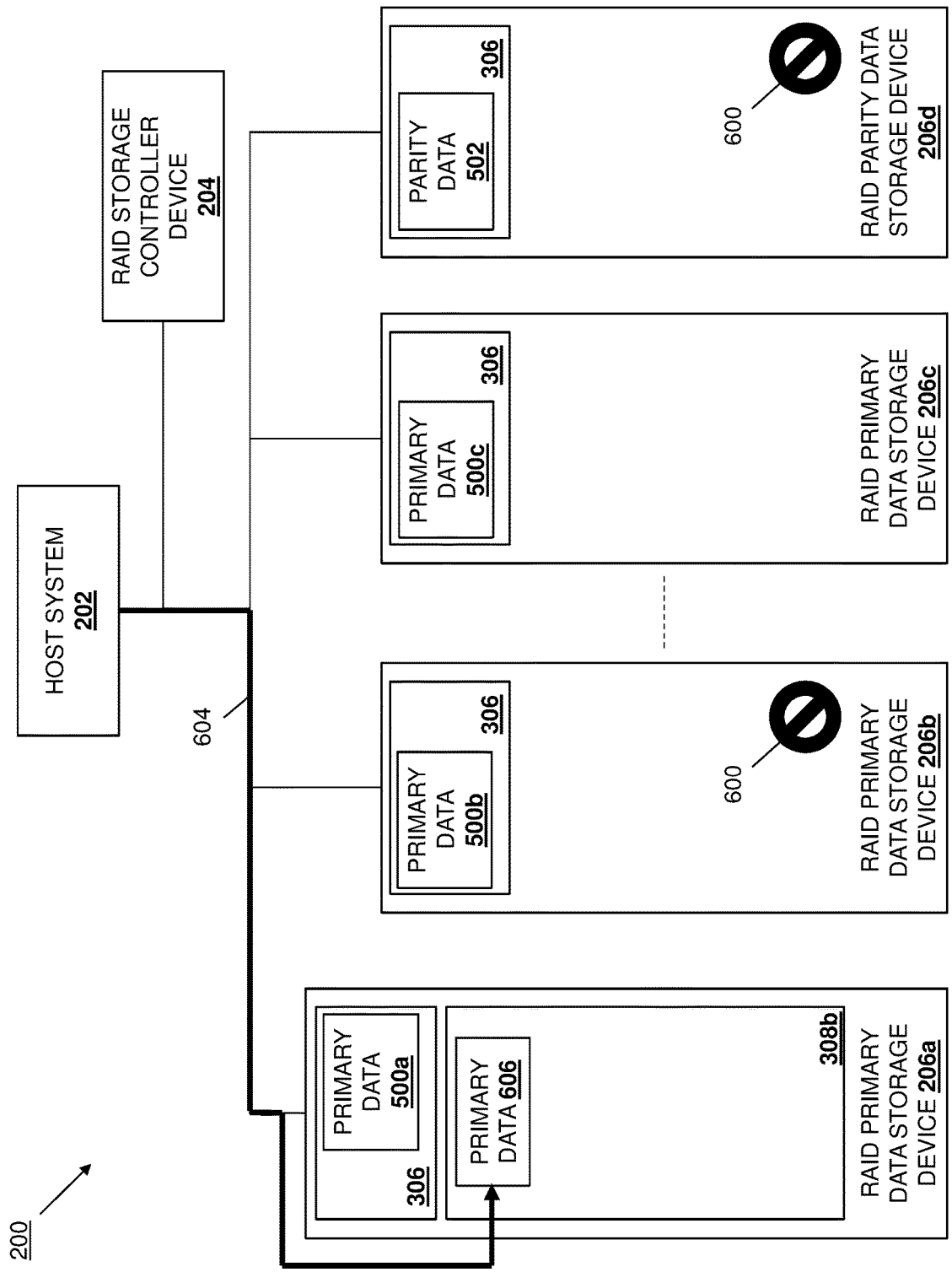
FIG. 6B is a schematic view illustrating an embodiment of the RAID storage system of FIG. 2 operating during the method of FIG. 4.

The method 400 then proceeds to block 404 where the first RAID primary data storage device retrieves the updated primary data. With reference to FIG. 6B, in an embodiment of block 404 and based on the command 602 (which is a multi-operation command as described above in this embodiment), the RAID storage engine 304 in the RAID primary data storage device 206a/300 may operate to perform a Direct Memory Access (DMA) operation 604 that accesses primary data 606 that is stored on the host system 202 (e.g., in a memory system or storage system included on the host system 202) and writes that primary data 606 to its second buffer subsystem 308b (e.g., in a CMB subsystem in the RAID primary data storage device 206a as described in the example above). As will be appreciated by one of skill in the art in possession of the present disclosure, the primary data 606 may be considered as "updated primary data" that provides an update to the primary data 500b that provides "current primary data" stored in the storage subsystem 306 in the RAID primary data storage device 206b, although other primary data writing scenarios will fall within the scope of the present disclosure as well.

Figure 6C:
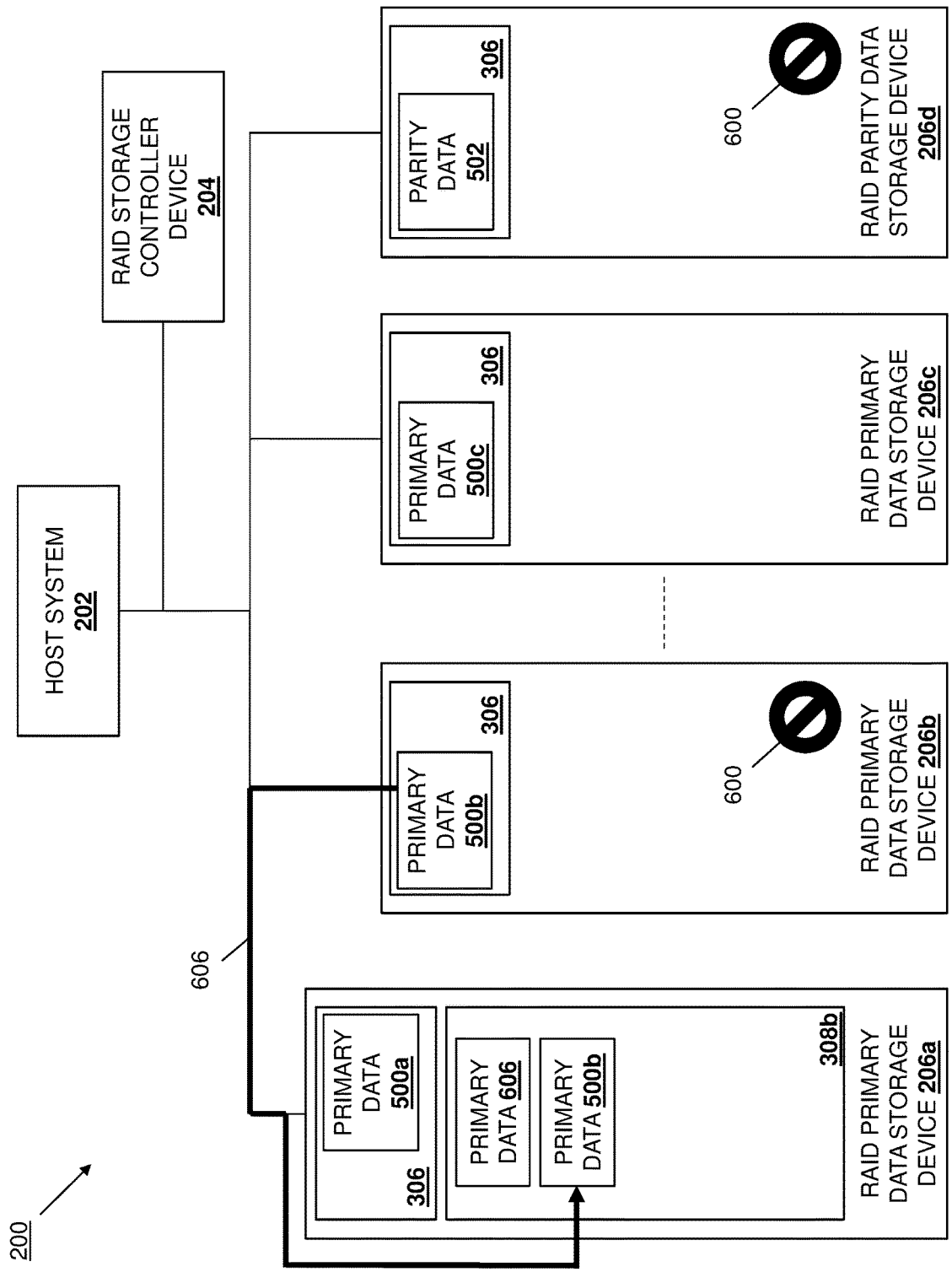
FIG. 6C is a schematic view illustrating an embodiment of the RAID storage system of FIG. 2 operating during the method of FIG. 4.

The method 400 then proceeds to block 406 where the first RAID primary data storage device retrieves current primary data from the second RAID primary data storage device. With reference to FIG. 6C, in an embodiment of block 406 and based on the command 602 (which is a multi-operation command as described above in this embodiment), the RAID storage engine 304 in the RAID primary data storage device 206a/300 may operate to perform a Direct Memory Access (DMA) operation 606 that accesses the primary data 500b that is stored on the storage subsystem 306 in the RAID primary data storage device 206b and writes that primary data 500b to its second buffer subsystem 308b (e.g., in a CMB subsystem in the RAID primary data storage device 206a as described in the example above). As discussed above, the primary data 500b may be considered as "current primary data" that is being updated with the primary data 606 (e.g., "updated primary data") from the host system 202, although other primary data writing scenarios will fall within the scope of the present disclosure as well.

Figure 6D:
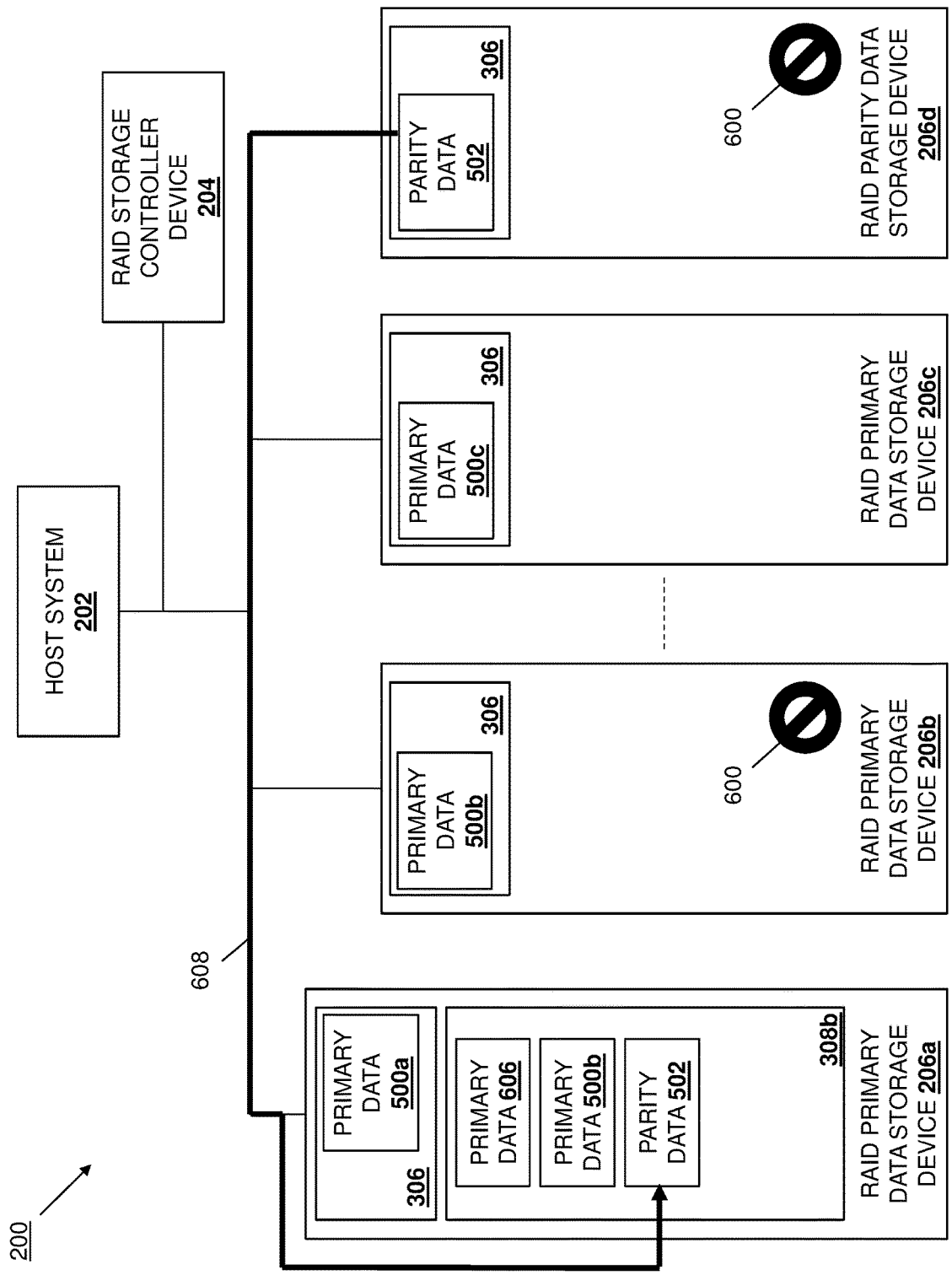
FIG. 6D is a schematic view illustrating an embodiment of the RAID storage system of FIG. 2 operating during the method of FIG. 4.

The method 400 then proceeds to block 408 where the RAID primary data storage device retrieves current parity data from a RAID parity data storage device. With reference to FIG. 6D, in an embodiment of block 408 and based on the command 602 (which is a multi-operation command as described above in this embodiment), the RAID storage engine 304 in the RAID primary data storage device 206a/300 may operate to perform a Direct Memory Access (DMA) operation 608 that accesses parity data 502 that is stored on the storage subsystem 306 in the RAID parity data storage device 206d and writes that parity data 502 to its second buffer subsystem 308b (e.g., in a CMB subsystem in the RAID primary data storage device 206a as described in the example above). As will be appreciated by one of skill in the art in possession of the present disclosure, the parity data 502 may be considered as "current parity data" that requires an update when the primary data 500b (e.g., "current primary data") is updated with the primary data 606 (e.g., "updated primary data") from the host system 202, although other primary data writing scenarios will fall within the scope of the present disclosure as well.

Figure 6E:
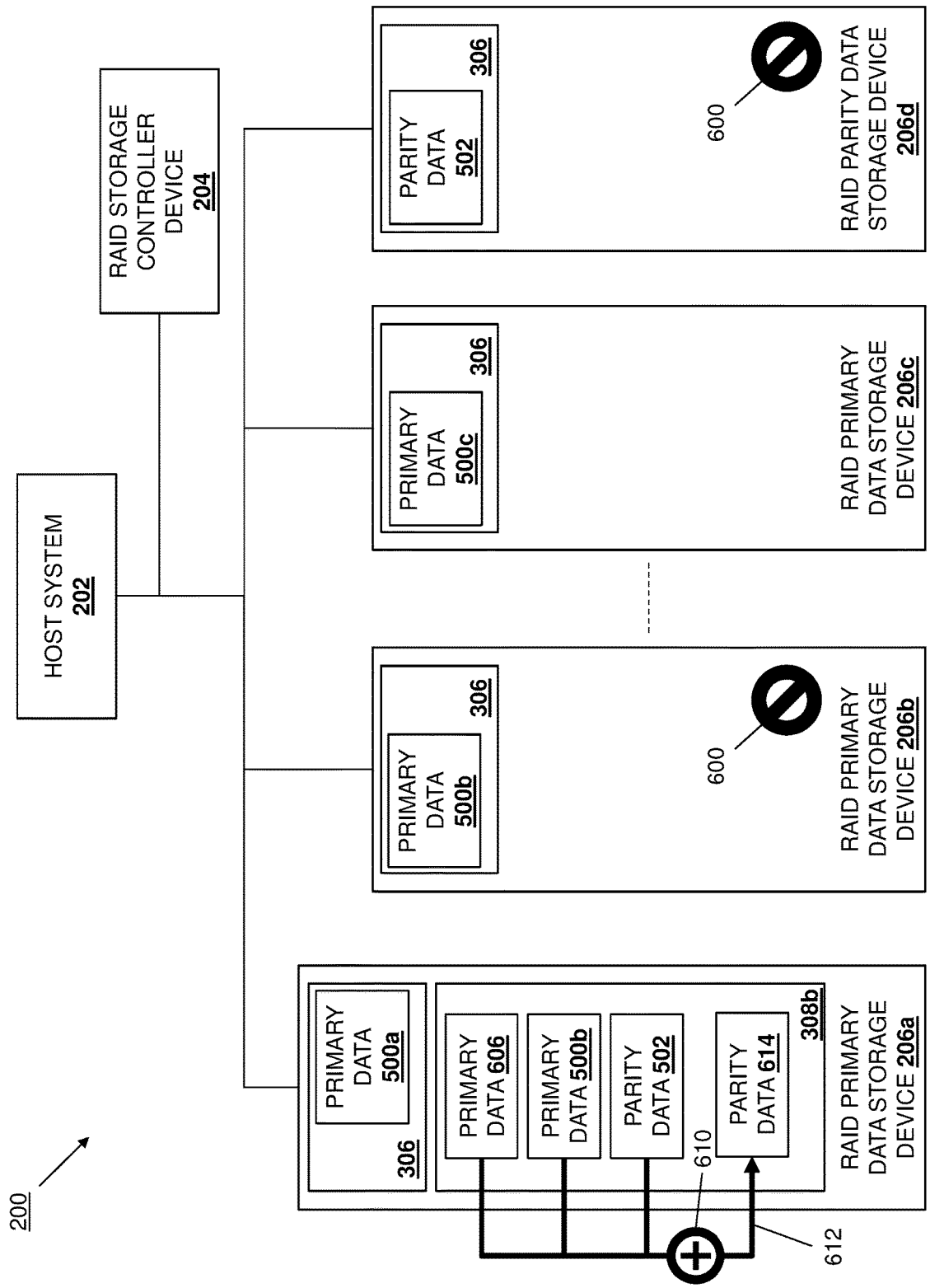
FIG. 6E is a schematic view illustrating an embodiment of the RAID storage system of FIG. 2 operating during the method of FIG. 4.

The method 400 then proceeds to block 410 where the first RAID primary data storage device performs an XOR operation on the updated primary data, the current primary data, and the current parity data to generate updated parity data. With reference to FIG. 6E, in an embodiment of block 410 and based on the command 602 (which is a multi-operation command as described above in this embodiment), the RAID storage engine 304 in the RAID primary data storage device 206a/300 may operate to perform an XOR operation 610 using the primary data 606 (e.g., "updated primary data") in its second buffer subsystem 308b, the primary data 500b (e.g., "current primary data") in its second buffer subsystem 308b, and the parity data 502 (e.g., "current parity data") in its second buffer subsystem 308b, in order to produce parity data 614, and then perform a write operation 612 to write that parity data 614 to its second buffer subsystem 308b (e.g., a CMB). As will be appreciated by one of skill in the art in possession of the present disclosure, the parity data 614 may be considered as "updated parity data" that is required to update the parity data 502 (e.g., "current parity data") when the primary data 500b (e.g., "current primary data") is updated with the primary data 606 (e.g., "updated primary data") from the host system 202, although other primary data writing scenarios will fall within the scope of the present disclosure as well.

Figure 6F:
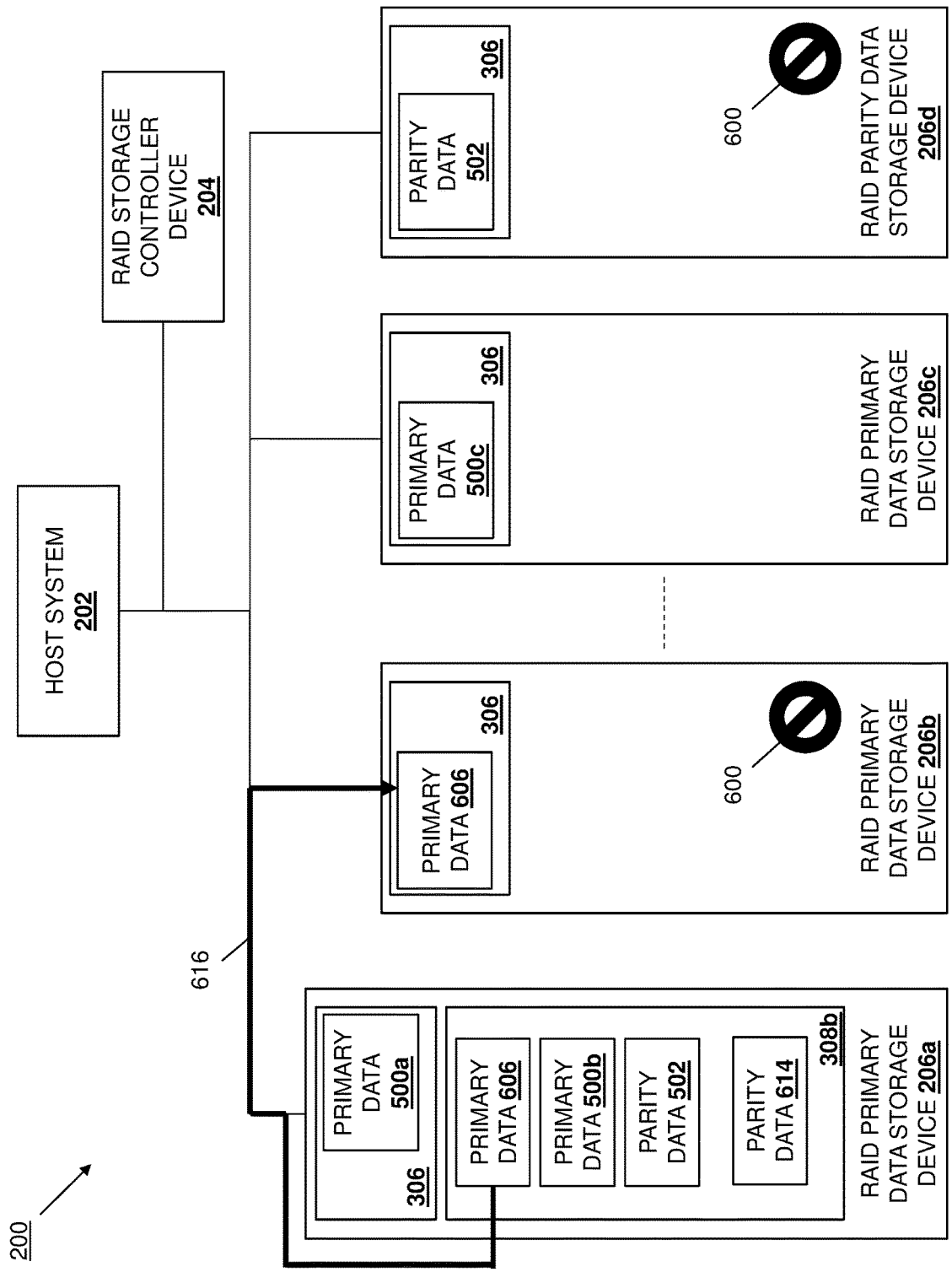
FIG. 6F is a schematic view illustrating an embodiment of the RAID storage system of FIG. 2 operating during the method of FIG. 4.

The method 400 then proceeds to block 412 where the first RAID primary data storage device transmits the updated primary data to the second RAID primary data storage device. With reference to FIG. 6F, in an embodiment of block 412 and based on the command 602 (which is a multi-operation command as described above in this embodiment), the RAID storage engine 304 in the RAID primary data storage device 206a/300 may operate to perform a primary data transmission operation 616 that transmits the primary data 606 (e.g., "updated primary data") that is stored on its second buffer subsystem 308b to the RAID primary data storage device 206b, and one of skill in the art in possession of the present disclosure will appreciate how, upon receiving the primary data 606, the RAID primary data storage device 206b may overwrite the primary data 500b (e.g., "current primary data") in its storage subsystem 306 with the primary data 606 (e.g., updated primary data").

Figure 6G:
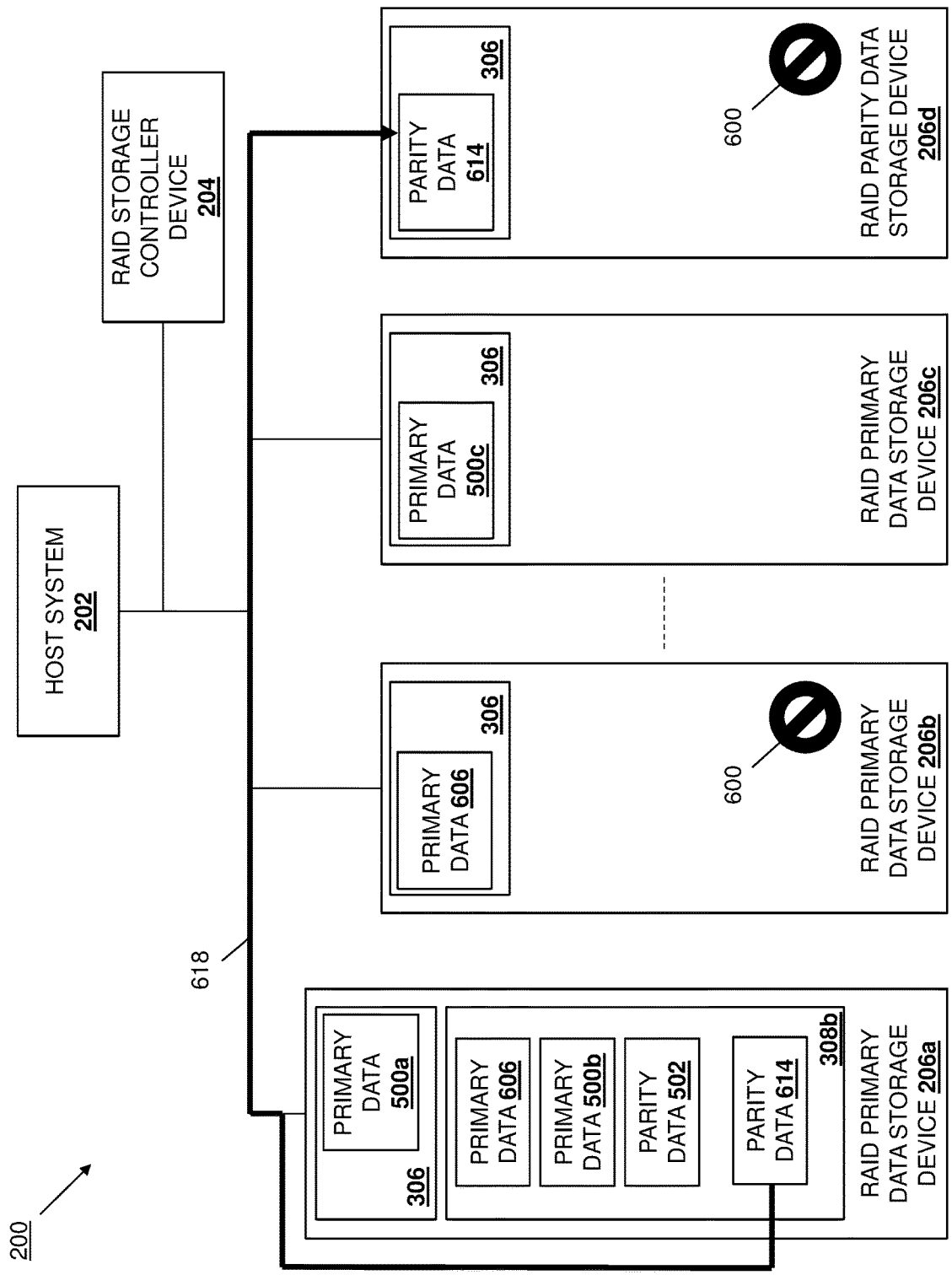
FIG. 6G is a schematic view illustrating an embodiment of the RAID storage system of FIG. 2 operating during the method of FIG. 4.

The method 400 then proceeds to block 414 where the first RAID primary data storage device transmits the updated parity data to the RAID parity data storage device. With reference to FIG. 6G, in an embodiment of block 414 and based on the command 602 (which is a multi-operation command as described above in this embodiment), the RAID storage engine 304 in the RAID primary data storage device 206a/300 may operate to perform a parity data transmission operation 618 that transmits the parity data 614 (e.g., "updated parity data") that is stored on its second buffer subsystem 308b to the RAID parity data storage device 206d, and one of skill in the art in possession of the present disclosure will appreciate how, upon receiving the parity data 614, the RAID parity data storage device 206d may overwrite the parity data 502 (e.g., "current parity data") in its storage subsystem 306 with the parity data 614 (e.g., updated parity data"). As will be appreciated by one of skill in the art in possession of the present disclosure, in some embodiments, at least a portion of the transmission of the updated primary data to the RAID primary data storage device 206b at block 412 and at least a portion of the transmission of the updated parity data to the RAID parity data storage device 206d may be performed simultaneously or at substantially the same time, although transmission of the updated primary data to the RAID primary data storage device 206b and the updated parity data to the RAID parity data storage device 206d may occur at different times while remaining within the scope of the present disclosure as well.

Figure 6H:
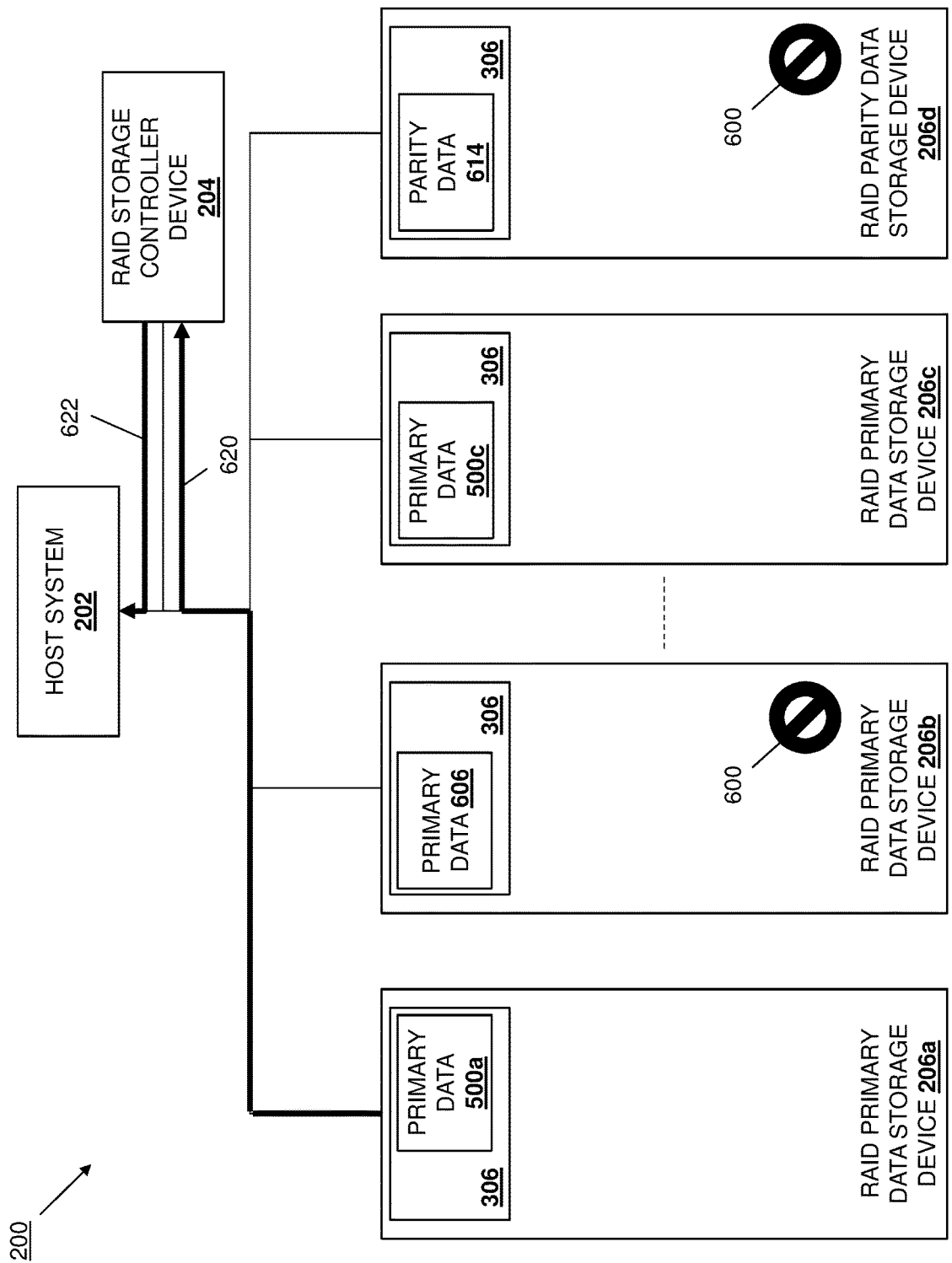
FIG. 6H is a schematic view illustrating an embodiment of the RAID storage system of FIG. 2 operating during the method of FIG. 4.

With reference to FIG. 6H, following completion of the operations associated with the command 602 (e.g., multiple operations associated with a multi-operation command as discussed above, following each operation associated with respective commands, etc.) the RAID storage engine 304 in the RAID primary data storage device 206a/300 may generate and transmit a completion message 620 to the RAID storage controller device 204. For example, the RAID storage engine 304 in the RAID parity data storage device 206a/300 may generate the completion message 620 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 6H, following the receiving of the completion message 620, the RAID storage controller device 204 may generate and transmit a completion message 622 to the host system 202 in order to indicate to the host system that the write command 601 has been completed.

As will be appreciated by one of skill in the art in possession of the present disclosure, the RAID storage-device-assisted data update operations performed by the "proxy" RAID primary data storage device 206a for the RAID primary data storage device 206b and the RAID parity data storage device 206d allow the RAID storage system 200 to include the RAID primary data storage device 206a and the RAID parity data storage device 206d that do not include storage-device-assisted data update functionality while realizing the benefits available from RAID storage-device-assisted data update functionality (e.g., reduced complexity RAID storage controller devices, RAID storage controller devices that can scale with high performance RAID storage device, etc.)

Figure 7:
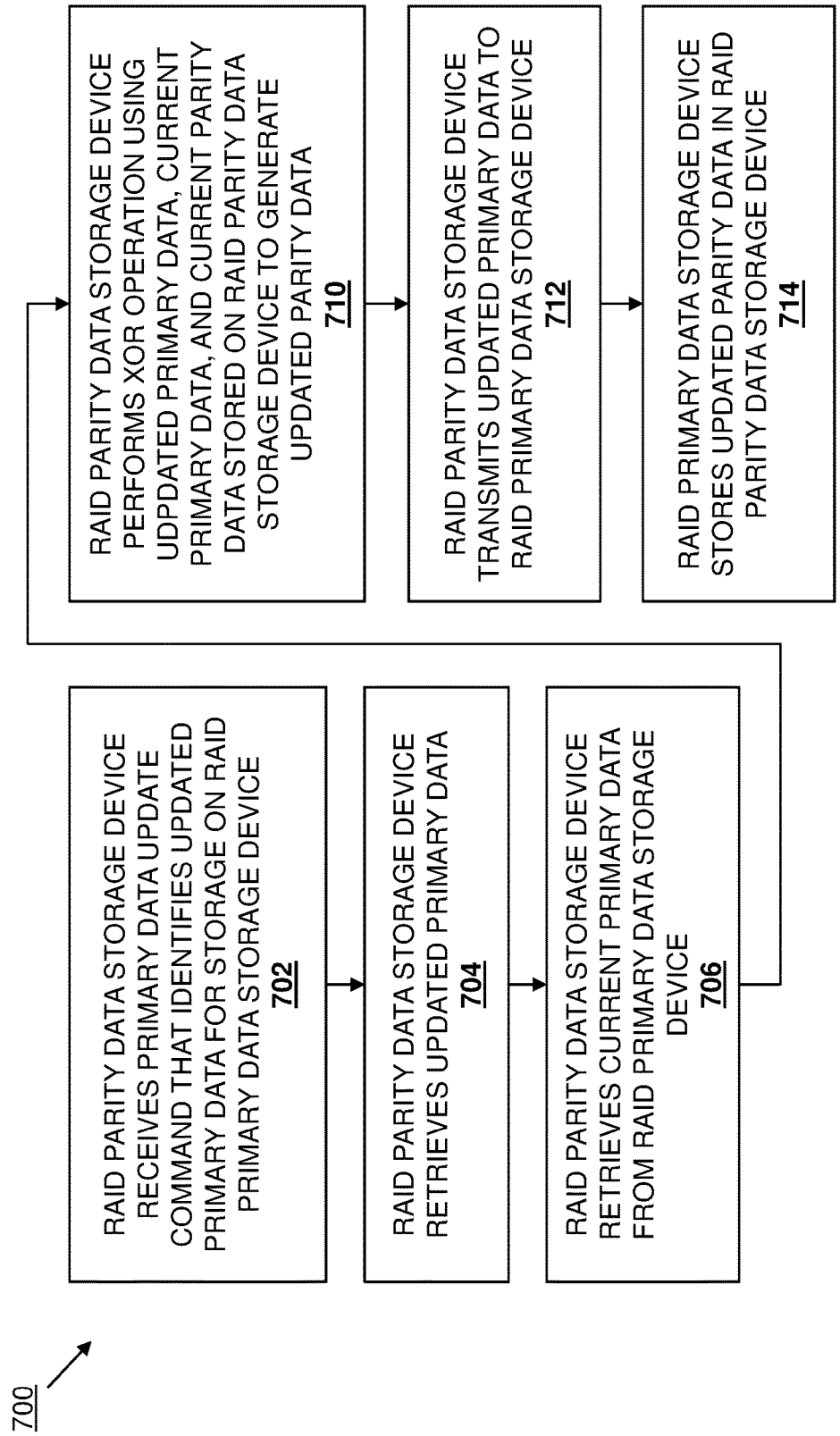
FIG. 7 is a flow chart illustrating an embodiment of a method for providing RAID proxy storage-device-assisted data updates.

Referring now to FIG. 7, an embodiment of a method 700 for RAID proxy storage-device-assisted data updates is illustrated. As discussed below, the embodiment of the method 700 described below provides another example of how the systems and methods of the present disclosure may provide a first RAID storage device that acts as a "proxy" to perform RAID storage-device-assisted data update operations for at least one second RAID storage device that does not include RAID storage-device-assisted data update functionality. For example, a RAID storage system may include a RAID primary data storage device that does not include storage-device-assisted data update functionality, along with a RAID parity data storage device that includes storage-device-assisted data update functionality. The RAID parity storage device may receive a primary data update command that identifies updated primary data on a host system for storage on the RAID primary data storage device and, in response, retrieve the updated primary data from the host system, and retrieve current primary data from the RAID primary data storage device. The RAID parity data storage device may then perform an XOR operation using the updated primary data and the current primary data, along with current parity data stored on the RAID parity data storage device, in order to generate updated parity data. The RAID parity data storage device may then transmit the updated primary data to the RAID primary data storage device, and store the updated parity data in the RAID parity data storage device. As such, RAID storage systems having some RAID storage devices that do not include storage-device-assisted data update functionality may realize the benefits available from RAID storage-device-assisted data update functionality (e.g., reduced complexity RAID storage controller devices, RAID storage controller devices that can scale with high performance RAID storage device, etc.) by using the RAID storage devices in that RAID storage system that do include storage-device-assisted data update functionality to act as "proxies" to perform storage-device-assisted data updates for the RAID storage devices that do not include storage-device-assisted data update functionality.

Similarly as discussed above with reference to FIG. 5, the RAID storage system 200 may be provided with the RAID primary data storage device 206a storing primary data 500a in its storage subsystem 306, the RAID primary data storage device 206b storing primary data 500b in its storage subsystem 306, the RAID primary data storage device 206c storing primary data 500c in its storage subsystem 306, and the RAID parity data storage device 206d storing parity data 502 in its storage subsystem 306. As discussed above, the RAID storage system 200 in the example provided for the method 700 discussed below with regard to FIGS. 8A-8F provides the RAID parity data storage device 206d having RAID storage-device-assisted data update functionality, and provides the RAID primary data storage device 206b without RAID storage-device-assisted data update functionality (as indicated by the element 800 in those figures.) However, as also discussed above, one of skill in the art in possession of the present disclosure will appreciate that different combinations of RAID storage devices in the RAID storage system 200 may be provided with and without RAID storage-device-assisted data update functionality while remaining within the scope of the present disclosure as well. As such, one of skill in the art in possession of the present disclosure will appreciate that any of the RAID storage devices in the RAID storage system 200 may act as a "proxy" to perform storage-device-assisted data update functionality for a RAID storage device that is not capable of such storage-device-assisted data update functionality while remaining within the scope of the present disclosure.

The method 700 begins at block 702 where a RAID parity data storage device receives a primary data update command that identifies updated primary data for storage on a RAID primary data storage device. Similarly as discussed above and with reference to FIG. 8A, the host system 202 may generate a write command 801 that instructs the writing of primary data that is located on the host system 200 to the RAID primary data storage devices 206a-206c, and may transmit that write command 801 to the RAID storage controller device 204. As will be appreciated by one of skill in the art in possession of the present disclosure, the generation and/or transmission of the write command 801 by the host system 202 to the RAID storage controller device 204 at block 802 may include a variety of control plane communications between the host system 202 and the RAID storage controller device 204 that have been omitted for clarity of discussion. As such, at block 802, the RAID storage controller device 204 may receive the write command 801 and, in response to that write command 801, may generate commands and transmit the commands to one or more of the RAID primary data storage devices 206a-d. The discussion below also describes a situation in which the RAID storage controller device 204 determines that the write command 801 requires that updated primary data be written to the RAID primary data storage device 206b.

As discussed above, in this example, the RAID primary data storage device 206b does not include RAID storage-device-assisted data update functionality, and in response to determining that the write command 801 requires that updated primary data be written to the RAID primary data storage device 206b (and corresponding updated parity data be written to the RAID parity data storage device 206d), the RAID storage controller device 204 may identify the RAID parity data storage device 206d as including the RAID storage-device-assisted data update functionality required to act as a "proxy" and perform the required primary and parity data update operations such that they may be offloaded from the RAID storage controller device 204. As discussed above, the RAID storage controller device 204 may include (or have access to) a database that identifies which RAID storage devices 206a-206d include RAID storage-device-assisted data update functionality, and in response to determining that data should be written to a RAID storage device, may use that database to determine if that RAID storage device includes RAID storage-device-assisted data update functionality and, if not, may use that database to identify a RAID storage device that does include RAID storage-device-assisted data update functionality.

Figure 8A:
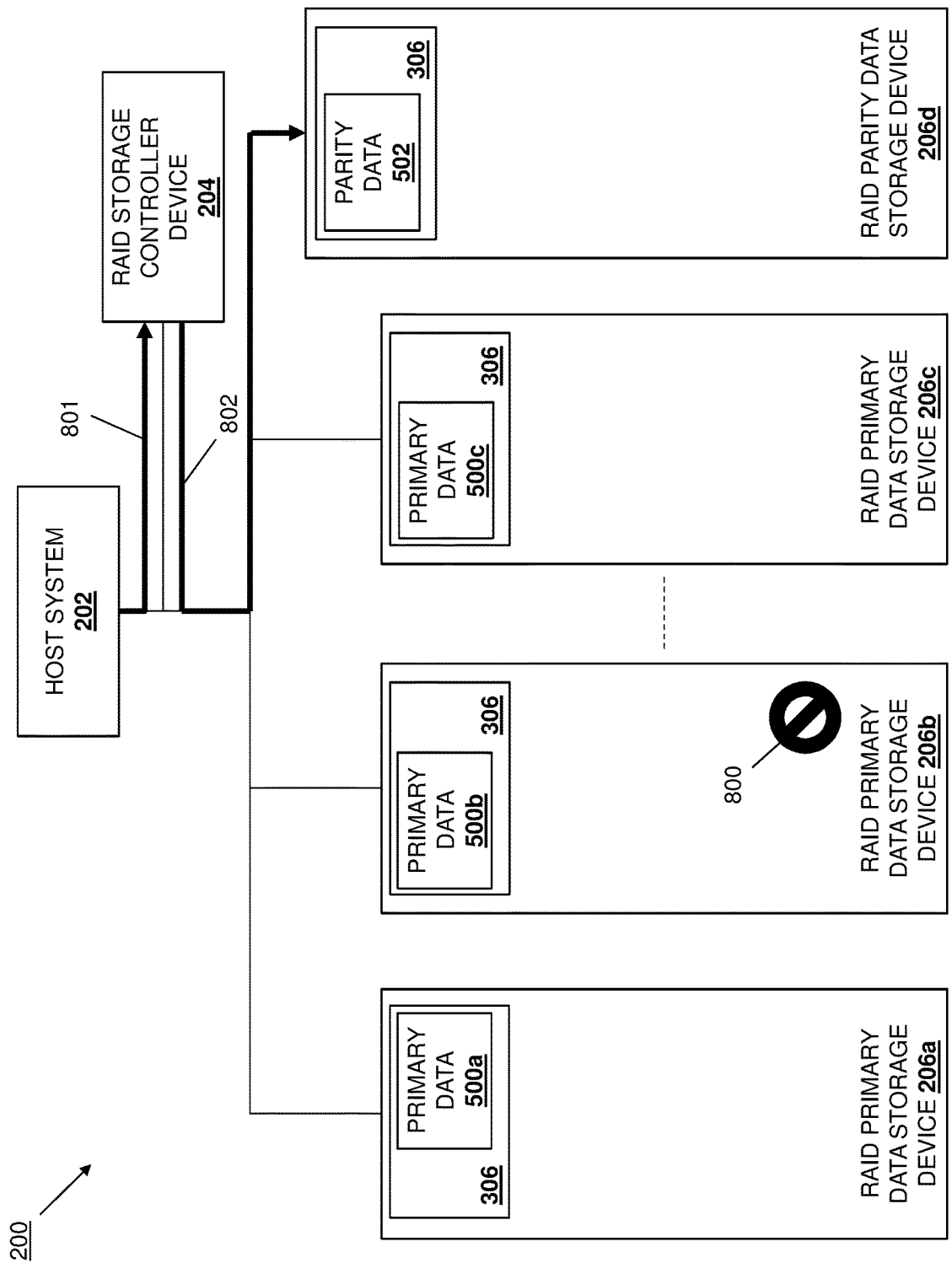
FIG. 8A is a schematic view illustrating an embodiment of the RAID storage system of FIG. 2 operating during the method of FIG. 7.

As such, in an embodiment of block 802, the RAID storage controller device 204 may generate a command that instructs the writing of the updated primary data on the host system 202 to the RAID primary data storage device 206b, and transmit that command to the RAID parity data storage device 206d. For example, FIG. 8A illustrates the RAID storage controller device 204 transmitting a command 802 to the RAID parity data storage device 206d, and one of skill in the art in possession of the present disclosure will appreciate that the command 802 may identify the updated primary data on the host system 202, the primary data storage device 206b to which that primary updated data should be written, as well as any other information that would be apparent to one of skill in the art in possession of the present disclosure.

Similarly as discussed above, the command 802 may be a multi-operation command like those described in U.S. patent application Ser. No. 16/585,296, filed on Sep. 27, 2019. For example, the command 802 may be a PROXY WRITE WITH XOR multi-operation command that is configured to cause the RAID parity data storage device 206d to perform the multiple operations described below. However, while described as providing a multi-operation command at block 802, one of skill in the art in possession of the present disclosure will recognize that the multiple operations performed by the RAID parity data storage device 206d discussed below may be performed in response to respective commands transmitted by the RAID storage controller device 204 while remaining within the scope of the present disclosure as well. In a specific example, the transmission of the command 802 may include the RAID storage controller device 204 providing the command 802 in a submission queue that is included in the communication system 310 in the RAID parity data storage device 206d/300, and then ringing a doorbell for the RAID parity data storage device 206d/300. However, one of skill in the art in possession of the present disclosure will recognize that the command 802 may be provided to the RAID parity data storage device 206d in a variety of manners that will fall within the scope of the present disclosure as well.

As such, in some examples the RAID storage engine 304 in the RAID parity data storage device 206d/300 may respond to the ringing of its doorbell by accessing the command 802 in the submission queue in its communication system 310. In embodiments in which the command 802 is a multi-operation command, the RAID storage engine 304 in the RAID parity data storage device 206d/300 may identify the multiple operations instructed by that command 802 (as described in U.S. patent application Ser. No. 16/585,296, filed on Sep. 27, 2019.)

Figure 8B:
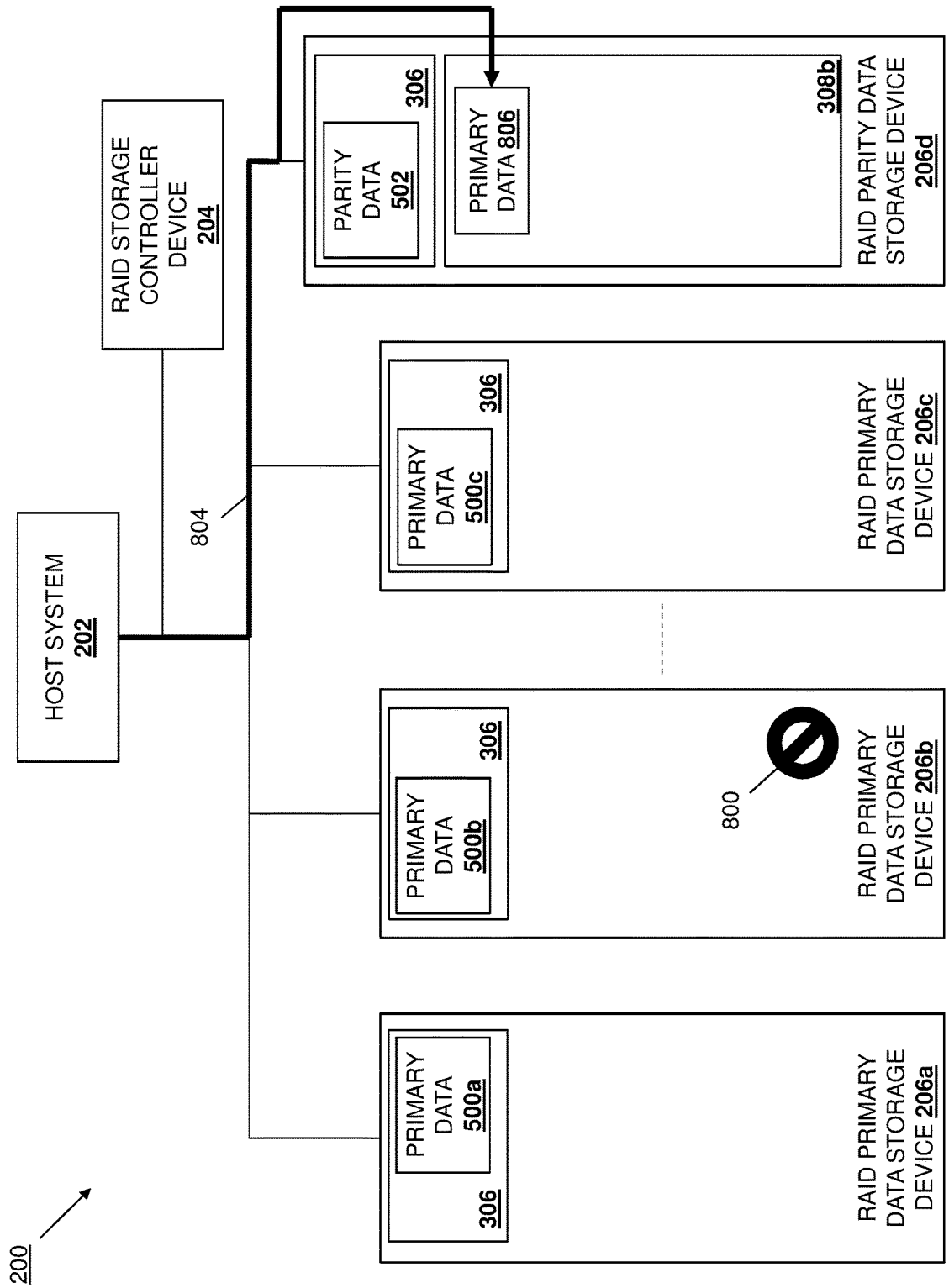
FIG. 8B is a schematic view illustrating an embodiment of the RAID storage system of FIG. 2 operating during the method of FIG. 7.

The method 700 then proceeds to block 704 where the RAID parity data storage device retrieves the updated primary data. With reference to FIG. 8B, in an embodiment of block 804 and based on the command 802 (which is a multi-operation command as described above in this embodiment), the RAID storage engine 304 in the RAID parity data storage device 206d/300 may operate to perform a Direct Memory Access (DMA) operation 804 that accesses primary data 806 that is stored on the host system 202 (e.g., in a memory system or storage system included on the host system 202) and writes that primary data 806 to its second buffer subsystem 308b (e.g., in a CMB subsystem in the RAID parity data storage device 206d as described in the example above). As will be appreciated by one of skill in the art in possession of the present disclosure, the primary data 806 may be considered as "updated primary data" that provides an update to the primary data 500b that may be considered as "current primary data" stored in the storage subsystem 306 in the RAID primary data storage device 206b, although other primary data writing scenarios will fall within the scope of the present disclosure as well.

Figure 8C:
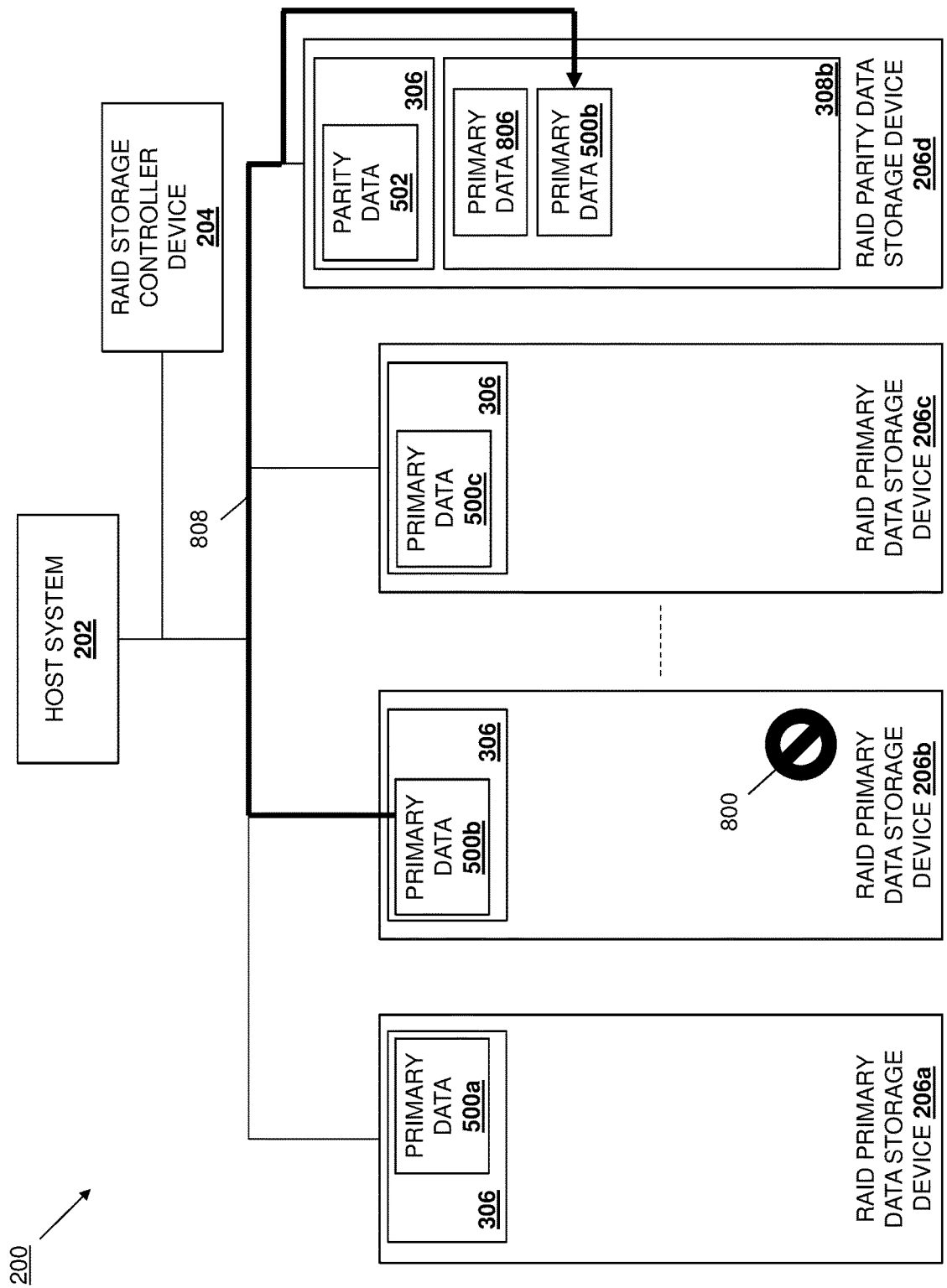
FIG. 8C is a schematic view illustrating an embodiment of the RAID storage system of FIG. 2 operating during the method of FIG. 7.

The method 700 then proceeds to block 706 where the RAID parity data storage device retrieves current primary data from the RAID primary data storage device. With reference to FIG. 8C, in an embodiment of block 706 and based on the command 802 (which is a multi-operation command as described above in this embodiment), the RAID storage engine 304 in the RAID parity data storage device 206d/300 may operate to perform a Direct Memory Access (DMA) operation 808 that accesses primary data 500b that is stored on the storage subsystem 306 in the RAID primary data storage device 206b and writes that primary data 500b to its second buffer subsystem 308b (e.g., in a CMB subsystem in the RAID parity data storage device 206d as described in the example above). As discussed above, the primary data 500b may be considered as "current primary data" that is being updated with the primary data 806 (e.g., "updated primary data") from the host system 202, although other primary data writing scenarios will fall within the scope of the present disclosure as well.

Figure 8D:
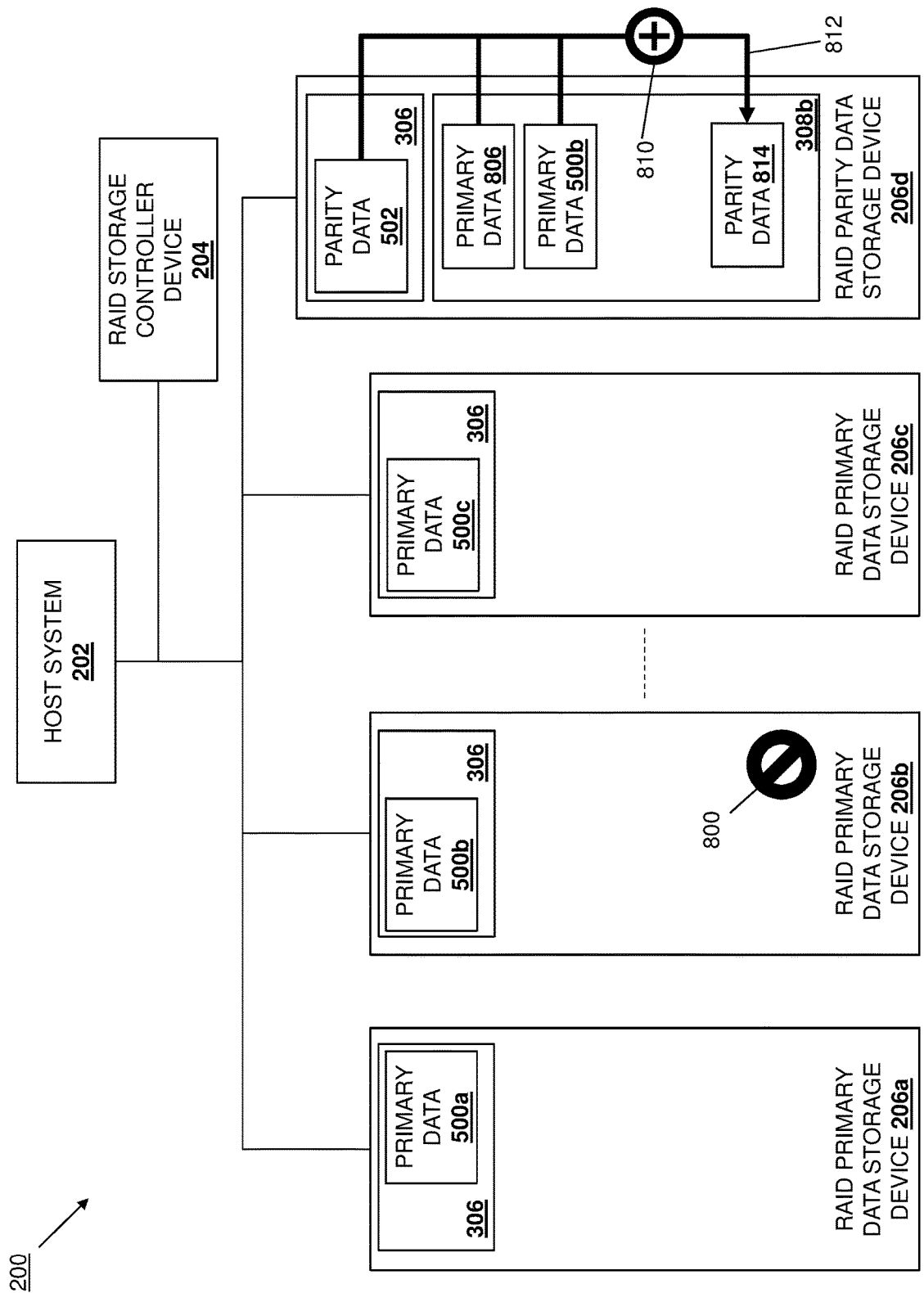
FIG. 8D is a schematic view illustrating an embodiment of the RAID storage system of FIG. 2 operating during the method of FIG. 7.

The method 700 then proceeds to block 710 where the RAID parity data storage device performs an XOR operation on the updated primary data and the current primary data, as well as current parity data that is stored on the RAID parity data storage device, in order to generate updated parity data. With reference to FIG. 8D, in an embodiment of block 710 and based on the command 802 (which is a multi-operation command as described above in this embodiment), the RAID storage engine 304 in the RAID parity data storage device 206d/300 may operate to perform an XOR operation 810 using the primary data 806 (e.g., "updated primary data") in its second buffer subsystem 308b, the primary data 500b (e.g., "current primary data") in its second buffer subsystem 308b, and the parity data 502 (e.g., "current parity data") in its storage subsystem 306, in order to produce parity data 814, and then perform a write operation 812 to write that parity data 814 to its second buffer subsystem 308b (e.g., a CMB subsystem). As will be appreciated by one of skill in the art in possession of the present disclosure, the parity data 814 may be considered as "updated parity data" that is required to update the parity data 502 (e.g., "current parity data") when the primary data 500b (e.g., "current primary data") is updated with the primary data 806 (e.g., "updated primary data") from the host system 202, although other primary data writing scenarios will fall within the scope of the present disclosure as well.

Figure 8E:
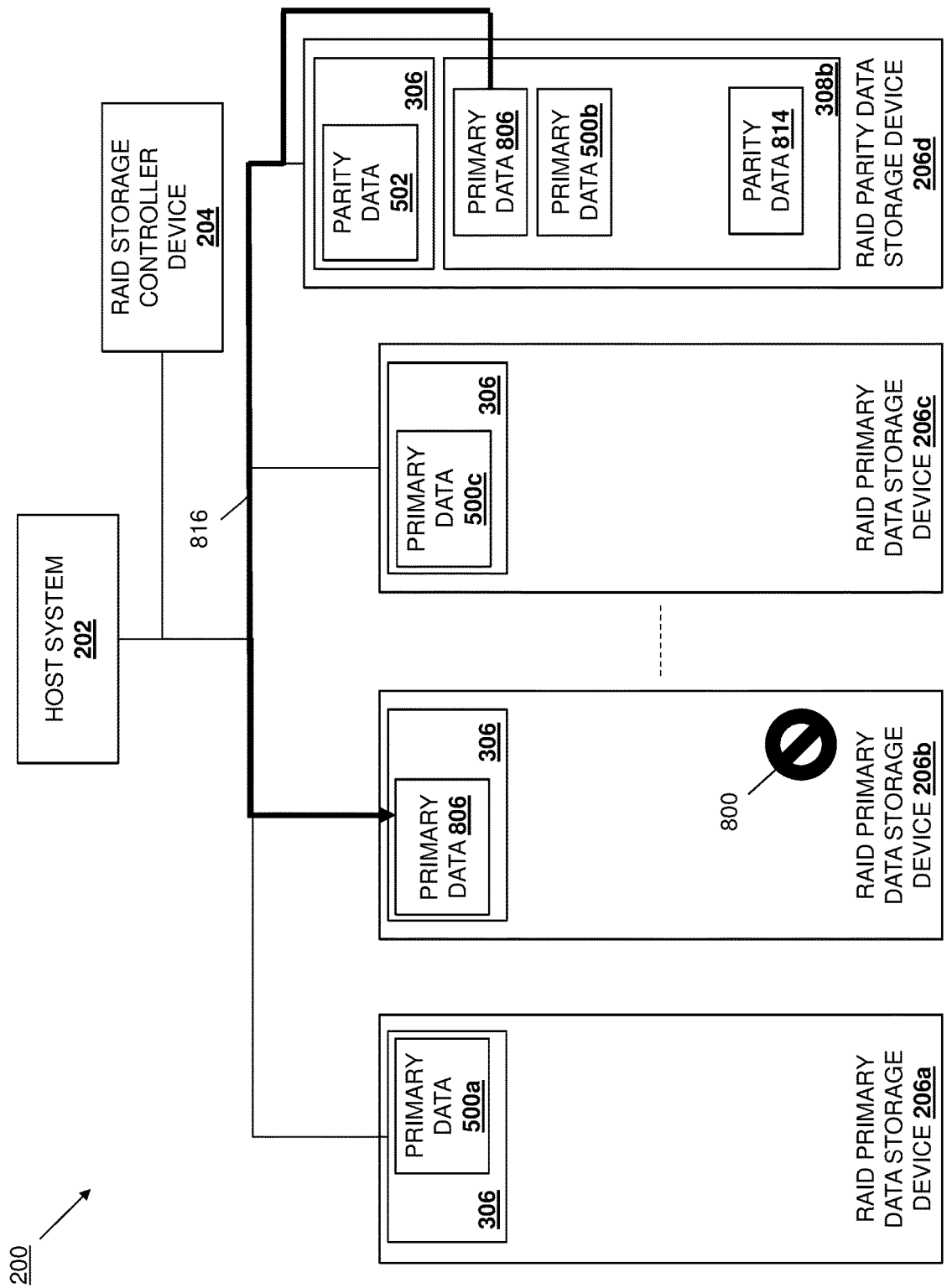
FIG. 8E is a schematic view illustrating an embodiment of the RAID storage system of FIG. 2 operating during the method of FIG. 7.

The method 700 then proceeds to block 712 where the RAID parity data storage device transmits the updated primary data to the RAID primary data storage device. With reference to FIG. 8E, in an embodiment of block 712 and based on the command 802 (which is a multi-operation command as described above in this embodiment), the RAID storage engine 304 in the RAID parity data storage device 206d/300 may operate to perform a primary data transmission operation 816 that transmits the primary data 806 (e.g., "updated primary data") that is stored on its second buffer subsystem 308b to the RAID primary data storage device 206b, and one of skill in the art in possession of the present disclosure will appreciate how, upon receiving the primary data 806, the RAID primary data storage device 206b may overwrite the primary data 500b (e.g., "current primary data") in its storage subsystem 306 with the primary data 806 (e.g., updated primary data").

Figure 8F:
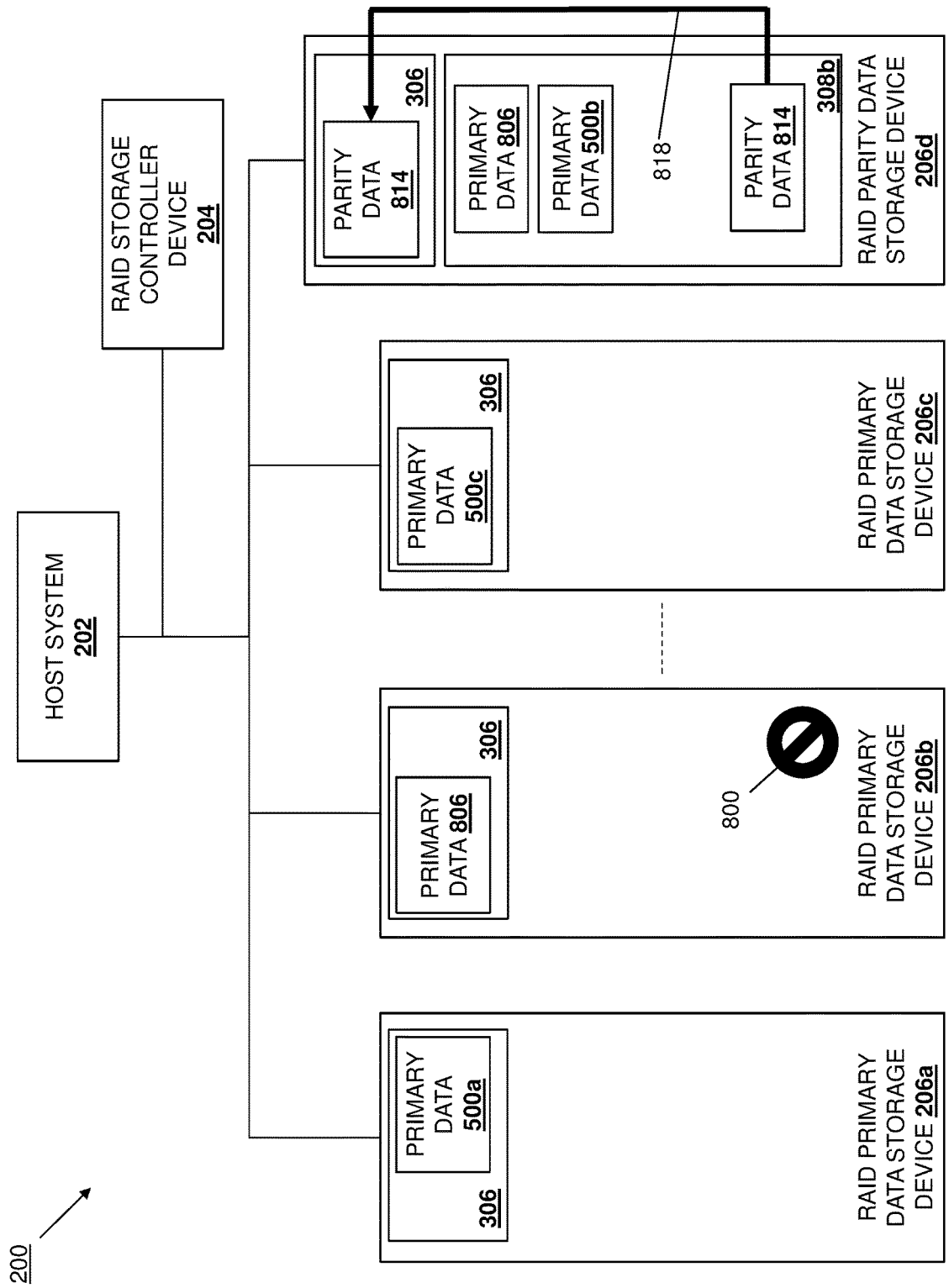
FIG. 8F is a schematic view illustrating an embodiment of the RAID storage system of FIG. 2 operating during the method of FIG. 7.

The method 700 then proceeds to block 714 where the RAID parity data storage device stores the updated parity data in the RAID parity data storage device. With reference to FIG. 8F, in an embodiment of block 714 and based on the command 802 (which is a multi-operation command as described above in this embodiment), the RAID storage engine 304 in the RAID parity data storage device 206d/300 may operate to perform a parity data storage operation 818 that overwrites the parity data 502 that is stored in its storage subsystem 206 with the parity data 814 (e.g., "updated parity data") that is stored on its second buffer subsystem 308b.

Figure 8G:
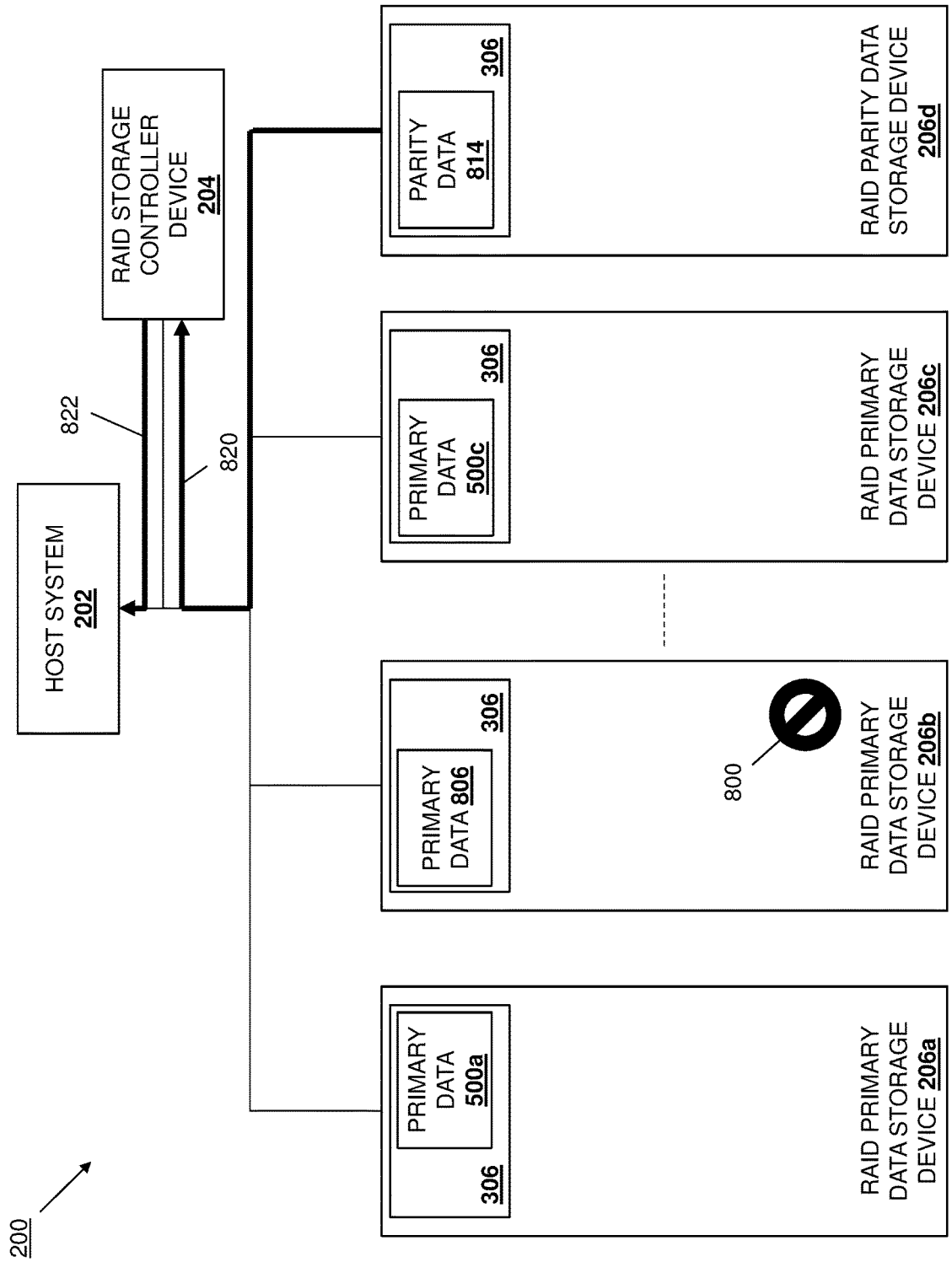
FIG. 8G is a schematic view illustrating an embodiment of the RAID storage system of FIG. 2 operating during the method of FIG. 7.

With reference to FIG. 8G, following completion of the operations associated with the command 802 (e.g., multiple operations associated with a multi-operation command as discussed above, following each operation associated with respective commands, etc.) the RAID storage engine 304 in the RAID parity data storage device 206d/300 may generate and transmit a completion message 820 to the RAID storage controller device 204. For example, the RAID storage engine 304 in the RAID parity data storage device 206a/300 may generate the completion message 820 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 8G, following the receiving of the completion message 820, the RAID storage controller device 204 may generate and transmit a completion message 822 to the host system 202 in order to indicate to the host system that the write command 801 has been completed.

As will be appreciated by one of skill in the art in possession of the present disclosure, the RAID storagedevice-assisted data update operations performed by the RAID parity data storage device 206d for the RAID primary data storage device 206b allow the RAID storage system 200 to include the RAID primary data storage device 206b that does not include storage-device-assisted data update functionality, while realizing the benefits available from RAID storage-device-assisted data update functionality (e.g., reduced complexity RAID storage controller devices, RAID storage controller devices that can scale with high performance RAID storage device, etc.) provided by another RAID data storage device in the RAID storage system 200. Furthermore, while two specific examples have been provided, one of skill in the art in possession of the present disclosure will appreciate that a variety of permutations of the RAID proxy storage-device-assisted data updates discussed above may be performed while remaining within the scope of the present disclosure. For example, in another embodiment, the RAID primary data storage device 206a that is RAID storage-device-assisted data update capable may retrieve the updated primary data for the RAID primary data storage device 206b that is not RAID storage-device-assisted data update capable, retrieve the current primary data from the RAID primary data storage device 206b, and provide the updated primary data to the RAID primary data storage device 206b for overwriting its current primary data, while also providing that updated primary data and current primary data to the RAID parity data storage device 206d for use by the RAID parity data storage device 206d in performing XOR operations to generate the updated parity data using that updated primary data and current primary data, along with the current parity data that is stored on the RAID parity data storage device 206d.

Thus, systems and methods have been described that provide a RAID NVMe storage device that acts as a "proxy" to perform RAID storage-device-assisted data update operations for at least one second RAID storage device that does not include RAID storage-device-assisted data update functionality. For example, a RAID storage system may include a RAID parity data storage device and a first RAID primary data storage device that do not include storage-device-assisted data update functionality, along with a second RAID primary data NVMe storage device that includes storage-device-assisted data update functionality. The second RAID primary data NVMe storage device may receive a primary data update command that identifies updated primary data on a host system for storage on the first RAID primary data storage device and, in response, retrieve the updated primary data from the host system, retrieve current primary data from the first RAID primary data storage device, and retrieve current parity data from the RAID primary parity data storage device. The second RAID primary data NVMe storage device may then perform an XOR operation using the updated primary data, the current primary data, and the current parity data to generate updated parity data, transmit the updated primary data to the first RAID primary data storage device, and transmit the updated parity data to the RAID parity data storage device. As such, RAID storage systems having some RAID storage devices that do not include storage-device-assisted data update functionality may realize the benefits available from RAID storage-device-assisted data update functionality (e.g., reduced complexity RAID storage controller devices, RAID storage controller devices that can scale with high performance RAID storage device, etc.) by using the RAID NVMe storage devices in that RAID storage system that do include storage-device-assisted data update functionality to act as "proxies" to perform storage-device-assisted data updates for the RAID storage devices that do not include storage-device-assisted data update functionality.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disks (RAID) proxy storage-device-assisted data update system, comprising:
 a Redundant Array of Independent Disks (RAID) parity data storage device that does not include storage-device-assisted data update functionality;
 a first RAID primary data storage device that does not include storage-device-assisted data update functionality; and
 a second RAID primary data storage device that includes storage-device-assisted data update functionality, and that is configured to:
  receive a primary data update command that identifies updated primary data on a host system for storage on the first RAID primary data storage device;
  retrieve the updated primary data from the host system;
  retrieve current primary data from the first RAID primary data storage device;
  retrieve current parity data from the RAID primary parity data storage device;
  perform an XOR operation using the updated primary data, the current primary data, and the current parity data to generate updated parity data;
  transmit the updated primary data to the first RAID primary data storage device; and
  transmit the updated parity data to the RAID parity data storage device.

2. The system of claim 1, wherein the retrieving the updated primary data from the host system includes:
 performing a write operation to write the updated primary data from the host system to a buffer subsystem in the second RAID primary data storage device.

3. The system of claim 1, wherein the retrieving the current primary data from the first RAID primary data storage device includes:
 performing a write operation to write the current primary data from the first RAID primary data storage device to a buffer subsystem in the second RAID primary data storage device.

4. The system of claim 1, wherein the retrieving the current parity data from the RAID parity data storage device includes:
 performing a write operation to write the current parity data from the RAID parity data storage device to a buffer subsystem in the second RAID primary data storage device.

5. The system of claim 1, wherein the second RAID primary data storage device is configured to:
 store the updated parity data in a buffer subsystem in the second RAID primary data storage device prior to providing the updated parity data on the RAID parity data storage device.

6. The system of claim 1, wherein at least a portion of the transmitting the updated primary data to the first RAID primary data storage device and at least a portion of the transmitting the updated parity data to the RAID parity data storage device is performed at the same time.

7. The system of claim 1, wherein the second RAID primary data storage device is provided by a Non-Volatile Memory Express (NVMe) storage device.

8. An Information Handling System (IHS), comprising:
a processing system; and
a memory system that is coupled to the processing system and that includes instructions that, when executed by the processing system, cause the processing system to provide a Redundant Array of Independent Disks (RAID) proxy storage-device-assisted data update engine that is configured to:
  receive a primary data update command that identifies updated primary data on a host system for storage on a RAID primary data storage device that does not include storage-device-assisted data update functionality;
  retrieve the updated primary data from the host system;
  retrieve current primary data from the RAID primary data storage device;
  retrieve current parity data from a RAID parity data storage device that does not include storage-device-assisted data update functionality;
  perform an XOR operation using the updated primary data, the current primary data, and the current parity data to generate updated parity data;
  transmit the updated primary data to the first RAID primary data storage device; and
  transmit the updated parity data to the RAID parity data storage device.

9. The IHS of claim 8, wherein the retrieving the updated primary data from the host system includes:
performing a write operation to write the updated primary data from the host system to a buffer subsystem that is connected to the processing system.

10. The IHS of claim 8, wherein the retrieving the current primary data from the RAID primary data storage device includes:
performing a write operation to write the current primary data from the RAID primary data storage device to a buffer subsystem that is connected to the processing system.

11. The IHS of claim 8, wherein the retrieving the current parity data from the RAID parity data storage device includes:
performing a write operation to write the current parity data from the RAID parity data storage device to a buffer subsystem that is connected to the processing system.

12. The IHS of claim 8, wherein the RAID proxy storage-device-assisted data update engine is configured to:
store the updated parity data in a buffer subsystem that is connected to the processing system prior to providing the updated parity data on the RAID parity data storage device.

13. The IHS of claim 8, wherein at least a portion of the transmitting the updated primary data to the RAID primary data storage device and at least a portion of the transmitting the updated parity data to the RAID parity data storage device is performed at the same time.

14. A method for Redundant Array of Independent Disks (RAID) proxy storage-device-assisted data updates, comprising:
receiving, by a first Redundant Array of Independent Disks (RAID) primary data storage device, a primary data update command that identifies updated primary data on a host system for storage on a second RAID primary data storage device that does not include storage-device-assisted data update functionality;
retrieving, by the first RAID primary data storage device, the updated primary data from the host system;
retrieving, by the first RAID primary data storage device, current primary data from the RAID primary data storage device;
retrieving, by the first RAID primary data storage device, current parity data from a RAID parity data storage device that does not include storage-device-assisted data update functionality;
performing, by the first RAID primary data storage device, an XOR operation using the updated primary data, the current primary data, and the current parity data to generate updated parity data;
transmitting, by the first RAID primary data storage device, the updated primary data to the second RAID primary data storage device; and
transmitting, by the first RAID primary data storage device, the updated parity data to the RAID parity data storage device.

15. The method of claim 14, wherein the retrieving the updated primary data from the host system includes:
performing a write operation to write the updated primary data from the host system to a buffer subsystem in the first RAID primary data storage device.

16. The method of claim 14, wherein the retrieving the current primary data from the second RAID primary data storage device includes:
performing a write operation to write the current primary data from the second RAID primary data storage device to a buffer subsystem in the first RAID primary data storage device.

17. The method of claim 14, wherein the retrieving the current parity data from the RAID parity data storage device includes:
performing a write operation to write the current parity data from the RAID parity data storage device to a buffer subsystem in the first RAID primary data storage device.

18. The method of claim 14, further comprising:
storing, by the first RAID primary data storage device, the updated parity data in a buffer subsystem in the first RAID primary data storage device prior to providing the updated parity data on the RAID parity data storage device.

19. The method of claim 14, wherein at least a portion of the transmitting the updated primary data to the second RAID primary data storage device and at least a portion of the transmitting the updated parity data to the RAID parity data storage device is performed at the same time.

20. The method of claim 14, wherein the first RAID primary data storage device is provided by a Non-Volatile Memory Express (NVMe) storage device.

* * * * *

UNITED STATES PATENT AND TRADEMARK OFFICE
CERTIFICATE OF CORRECTION

PATENT NO. : 11,093,329 B1
APPLICATION NO. : 16/832752
DATED : August 17, 2021
INVENTOR(S) : Gary Benedict Kotzur et al.

It is certified that error appears in the above-identified patent and that said Letters Patent is hereby corrected as shown below:

In the Specification

Column 1, Line 67, "16/586,446" should be changed to --16/586,445--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*